(12) United States Patent
Son et al.

(10) Patent No.: US 10,496,892 B2
(45) Date of Patent: Dec. 3, 2019

(54) APPARATUS FOR PROVIDING AROUND VIEW IMAGE, AND VEHICLE

(71) Applicant: LG Electronics Inc., Seoul (KR)

(72) Inventors: Jongin Son, Seoul (KR); Yeonchool Park, Seoul (KR)

(73) Assignee: LG Electronics Inc., Seoul (KR)

( * ) Notice: Subject to any disclaimer, the term of this patent is extended or adjusted under 35 U.S.C. 154(b) by 84 days.

(21) Appl. No.: 15/801,466

(22) Filed: Nov. 2, 2017

(65) Prior Publication Data

US 2018/0121742 A1  May 3, 2018

(30) Foreign Application Priority Data

Nov. 2, 2016 (KR) .................. 10-2016-0145238

(51) Int. Cl.
*G06K 9/00* (2006.01)
*G06T 7/73* (2017.01)
(Continued)

(52) U.S. Cl.
CPC ......... *G06K 9/00812* (2013.01); *B60D 1/30* (2013.01); *B60W 10/04* (2013.01); *B60W 10/18* (2013.01);
(Continued)

(58) Field of Classification Search
CPC ......... G06K 9/00812; G06K 9/00798; G06K 9/00791; G06K 9/209; G06K 9/78; G06K 9/20; G06K 9/52; G06K 2009/2045; G06T 7/74; G06T 7/60; G06T 7/20; G06T 3/4038; G06T 2207/30252; G06T 2207/30264; B60R 1/00; B60R 1/12; B60R 1/002; B60R 1/003; B60R 2001/1253; B60R 2300/607; B60R 2300/806; B60R 2300/102; B60R 2300/105; B60R 2300/30; B60R 2300/302; B60R 2300/303; B60R 2300/307; B60R 2300/80; B60R 2300/808; B60R 2300/8086; B60R 2300/8093;
(Continued)

(56) References Cited

U.S. PATENT DOCUMENTS 10,259,390 B2 * 4/2019 Zhang ................ G06T 7/73
2006/0111820 A1  5/2006 Goetting
(Continued)

FOREIGN PATENT DOCUMENTS

DE  102008045436 A1  3/2010
JP  2003235036  8/2003
(Continued)

OTHER PUBLICATIONS

Extended European Search Report in European Application No. 17199631.7, dated Mar. 29, 2018, 8 pages.

*Primary Examiner* — Jose L Couso
(74) *Attorney, Agent, or Firm* — Fish & Richardson P.C.

(57) ABSTRACT

An apparatus that provides an around view image and that includes: a camera unit that is configured to obtain an outside image of the vehicle; and a processor that is configured to: determine a connection state between a trailer and the vehicle, receive the outside image of the vehicle from the camera unit, based on the outside image of the vehicle, determine an attitude of the trailer, and based on the attitude of the trailer, generate a control signal to control travel of the vehicle is disclosed.

18 Claims, 21 Drawing Sheets

(51) Int. Cl.
- *B60W 10/04* (2006.01)
- *B60W 10/18* (2012.01)
- *B60W 10/20* (2006.01)
- *B62D 15/02* (2006.01)
- *G01C 21/28* (2006.01)
- *G06K 9/20* (2006.01)
- *G06K 9/78* (2006.01)
- *G06T 7/60* (2017.01)
- *B60D 1/30* (2006.01)
- *B62D 13/06* (2006.01)
- *G08G 1/16* (2006.01)

(52) U.S. Cl.
CPC ............ *B60W 10/20* (2013.01); *B62D 13/06* (2013.01); *B62D 15/021* (2013.01); *B62D 15/025* (2013.01); *G01C 21/28* (2013.01); *G06K 9/00791* (2013.01); *G06K 9/209* (2013.01); *G06K 9/78* (2013.01); *G06T 7/60* (2013.01); *G06T 7/74* (2017.01); *G08G 1/168* (2013.01); *G06T 2207/30204* (2013.01); *G06T 2207/30264* (2013.01)

(58) Field of Classification Search
CPC .... H04N 5/23293; H04N 5/272; H04N 5/247; H04N 5/2624; H04N 5/265; H04N 5/23238; H04N 5/23296; H04N 7/181; H04N 7/183; B60D 1/30; B60D 1/245; B60D 1/62; B60K 35/00; B60K 2350/106; B60K 2350/1088; B60K 2350/2013; B60K 2350/2017; B60K 2350/2026; B60K 2350/2095; B60K 2350/927; B60T 7/20; B60T 8/1708; B60T 8/248; B60T 8/171; B60T 2001/022; B60T 2001/10; B60T 2230/06; B60T 2270/413; B60W 10/04; B60W 10/18; B60W 10/20; B60W 30/00; B60W 30/09; B60W 30/18036; B60W 50/14; B60W 50/16; B60W 2050/143; B60W 2050/146; B60W 2300/14; B60W 2420/42; B60W 2550/20; B60W 2550/10; B60W 2710/20; B60W 2520/22; B60W 2720/24; B62D 13/06; B62D 15/021; B62D 15/025; B62D 15/027; B62D 15/0285; B62D 15/0275; B62D 15/0295; B60Y 2200/147; B60Y 2400/92; G08G 1/168; G08G 1/165; G08G 1/166; G01C 21/28; G01C 21/3664; B60Q 9/002; G05D 2201/0213

See application file for complete search history.

(56) References Cited

U.S. PATENT DOCUMENTS

| | | |
|---|---|---|
| 2012/0245796 A1 | 9/2012 | Yu et al. |
| 2014/0085472 A1* | 3/2014 | Lu .................. B60R 1/002 348/148 |
| 2014/0160276 A1* | 6/2014 | Pliefke .............. B60R 1/00 348/118 |
| 2014/0176716 A1* | 6/2014 | Wallat ............. B62D 15/025 348/148 |
| 2014/0200759 A1* | 7/2014 | Lu .................. B60D 1/245 701/28 |
| 2014/0222288 A1 | 8/2014 | Lavoie et al. |
| 2014/0358424 A1 | 12/2014 | Lavoie |
| 2015/0217693 A1* | 8/2015 | Pliefke .............. B60R 1/00 348/118 |
| 2015/0286878 A1* | 10/2015 | Molin ............... G06K 9/20 348/148 |
| 2015/0345939 A1* | 12/2015 | Salter ............. H05B 37/0218 356/138 |
| 2016/0129896 A1 | 5/2016 | Tu et al. |
| 2016/0129939 A1* | 5/2016 | Singh ............... B62D 13/06 701/41 |
| 2016/0167651 A1 | 6/2016 | Schwindt et al. |
| 2017/0050567 A1* | 2/2017 | Bochenek ........... B60R 1/003 |
| 2017/0050672 A1* | 2/2017 | Gieseke ............. B62D 13/06 |
| 2017/0073003 A1* | 3/2017 | Shepard ............ B62D 13/06 |
| 2017/0106865 A1* | 4/2017 | Lavoie ............. B62D 15/027 |
| 2017/0341583 A1* | 11/2017 | Zhang .............. G06T 7/73 |
| 2018/0001928 A1* | 1/2018 | Lavoie ............. B62D 13/06 |
| 2018/0299885 A1* | 10/2018 | Herzog ............. B62D 13/06 |
| 2018/0319438 A1* | 11/2018 | Herzog ............. B60R 11/04 |

FOREIGN PATENT DOCUMENTS

| | | |
|---|---|---|
| KR | 10-2009-0105230 | 10/2009 |
| KR | 101469562 | 12/2014 |
| KR | 10-2016-0033998 | 3/2016 |

* cited by examiner

ALIGNED STATE

NON-ALIGNED STATE

ALIGNED STATE

NON-ALIGNED STATE

APPARATUS FOR PROVIDING AROUND VIEW IMAGE, AND VEHICLE

CROSS-REFERENCE TO RELATED APPLICATION

This application claims the priority benefit of Korean Patent Application No. 10-2016-0145238, filed on Nov. 2, 2016 in the Korean Intellectual Property Office, the entire content of which is incorporated herein by reference.

TECHNICAL FIELD

The present application relates to technologies related to an apparatus for providing an around view image and a vehicle.

BACKGROUND

A vehicle is an apparatus that moves in a direction desired by a user riding therein. A representative example of a vehicle may be an automobile.

In some implementations, a variety of sensors and electronic devices have been mounted in vehicles for the convenience of a user who uses the vehicle. In particular, for user driving convenience, various apparatuses are being developed.

In some implementations, parking, driving, and selecting a roadway may be a challenge for a trailer truck or a vehicle with a trailer attached thereto.

In addition, when an additional device is attached to a vehicle, there may be a problem that an Around View Monitor (AVM) camera readily attached to the vehicle cannot be used for parking and driving.

SUMMARY

In general, one innovative aspect of the subject matter described in this specification can be implemented in an apparatus for providing an around view image, the apparatus including: a camera unit that is configured to obtain an outside image of the vehicle; and a processor that is configured to: determine a connection state between a trailer and the vehicle, receive the outside image of the vehicle from the camera unit, based on the outside image of the vehicle, determine an attitude of the trailer, and based on the attitude of the trailer, generate a control signal to control travel of the vehicle.

The foregoing and other implementations can each optionally include one or more of the following features, alone or in combination. In particular, one implementation includes all the following features in combination. The apparatus further includes an interface that is configured to receive data from the trailer, wherein the processor is configured to: based on the data, determine the connection state between the trailer and the vehicle. The apparatus further includes: a memory that is configured to store markers representing a preset attitude of the trailer, wherein the processor is configured to: obtain a rear view image of the vehicle from the camera unit, detect the trailer from the rear view image, receive the markers from the memory, match each of the markers with at least one portion of the trailer in the rear view image, determine an angle between the at least one portion of the trailer and each of the markers, and based on the angle, determine the attitude of the trailer. The apparatus further includes: an interface that is configured to receive gyro sensing information from a gyro sensor that is mounted on the trailer, wherein the processor is configured to: based on the gyro sensing information, determine the attitude of the trailer. The processor is configured to: obtain a plurality of images from the camera unit, based on (i) a vehicle image of the vehicle and (ii) the plurality of images, generate a first around view image, and provide the first around view image to a display. The apparatus further includes: an interface that is configured to receive an outside image of the trailer from a camera unit of the trailer, wherein the processor is configured to: based on (i) the first around view image and (ii) the outside image of the trailer, generate a second around view image, and provide the second around view image to the display. The interface is configured to: receive sensing information from one or more sensors of the trailer, the one or more sensors including at least one of a radar, a lidar, an ultrasonic sensor, or an infrared sensor, and wherein the processor is configured to: based on the sensing information, generate a third around view image, and provide the third around view image to the display. The apparatus further includes: a memory that is configured to store a plurality of Look Up Tables (LUTs), each LUT of the plurality of LUTs corresponding to a respective attitude of the trailer, wherein, based on a current attitude of the trailer, the processor is configured to: receive a first LUT from the plurality of LUTs, the first LUT corresponding to the current attitude of the trailer, determine a fourth around view image that corresponds to the first LUT, and provide the fourth around view image to the display. The processor is configured to: based on a driving condition of the trailer, generate a control signal to operate a hitch at (i) a fixed state in which the hitch is fixed or (ii) an adjustable state in which the hitch is adjustable. The processor is configured to: in a state in which the vehicle travels straight, generate a control signal to operate the hitch at the fixed state. The processor is configured to: determine whether a turning angle of the vehicle satisfies a first angle, and based on a determination that the turning angle of the vehicle satisfies the first angle, generate a control signal to operate the hitch at the adjustable state. The processor is configured to: based on an attitude of the trailer, generate a control signal to control at least one of acceleration, braking, or steering of the vehicle. The processor is configured to: obtain object detection information about an object located outside the vehicle, and based on an attitude of the trailer, adjust the object detection information. The processor is configured to: based on the object detection information, detect a first distance between the trailer and the object; determine whether the first distance satisfies a first reference distance, based on a determination that the first distance satisfies the first reference distance, determine whether there is a risk of collision between the trailer and the object, and based on a determination that there is a risk of collision between the trailer and the object, generate a control signal to control the vehicle to keep a second distance between the trailer and the object. The processor is configured to: obtain one or more images from the vehicle and the trailer, based on the one or more images, determine a travel lane of the trailer, and generate a control signal to control the vehicle such that the trailer maintains the travel lane. The processor is configured to: based on an attitude of the trailer, generate a parking path for parking the trailer, and generate a control signal to control the vehicle such that the trailer moves along the parking path. The processor is configured to: based on an attitude of the trailer, generate a control signal to control wheels of the trailer, the control signal being configured to control at least one of braking or steering of the trailer. The processor is configured to: obtain object detection information about an object located outside the vehicle, and based on the object detection information, detect a third distance between the trailer and the object, determine whether the third distance satisfies a second reference distance, based on a determination that the third distance satisfies the second reference distance, determine whether there is a risk of collision between the trailer and the object, and based on a determination that there is a risk of collision between the trailer and the object, generate a control signal to control the trailer to keep a fourth distance between the trailer and the object. The processor is configured to: obtain one or more images from the vehicle and the trailer, based on the one or more images, determine a travel lane of the trailer, and generate a control signal to control the trailer to maintain the travel lane. The processor is configured to: obtain information about a travel path of the vehicle, and based on the information about the travel path of the vehicle, generate the control signal to control the trailer to move along the travel path of the vehicle.

The subject matter described in this specification can be implemented in particular examples so as to realize one or more of the following advantages. An apparatus for providing an around view image acquires an image of a blind spot using a camera for a trailer that is coupled to a vehicle. The apparatus can get the image of the blind spot for any kind or any size of trailer. In addition, the apparatus provides the around view image to a driver of the vehicle so that the driver can safely drive or park the vehicle and the trailer. Moreover, the apparatus can include an Advanced Driver Assistance System (ADAS) and an AVM system to improve the efficiency.

The details of one or more examples of the subject matter described in this specification are set forth in the accompanying drawings and the description below. Other potential features, aspects, and advantages of the subject matter will become apparent from the description, the drawings, and the claim.

BRIEF DESCRIPTION OF THE DRAWINGS

Like reference numbers and designations in the various drawings indicate like elements.

DETAILED DESCRIPTION

A vehicle can include an automobile and a motorcycle. A vehicle can include all of an internal combustion engine vehicle including an engine as a power source, a hybrid vehicle including both an engine and an electric motor as a power source, and an electric vehicle including an electric motor as a power source.

Figure 1:
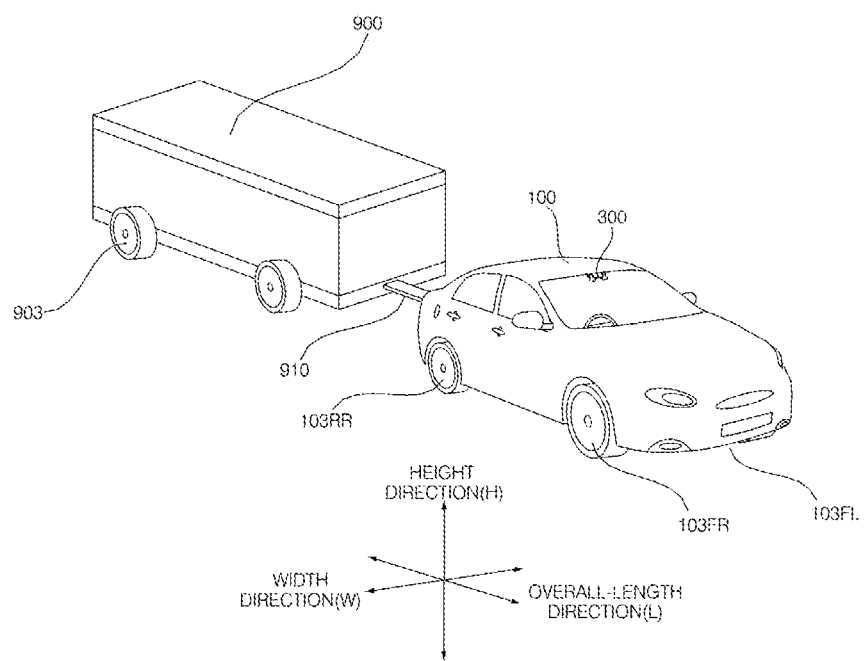
FIG. 1 is a diagram illustrating an example exterior of a vehicle and a trailer.

FIG. 1 illustrates an example exterior of a vehicle and a trailer.

Referring to FIG. 1, a vehicle 100 may include wheels 103FR,103FL,103RL, which are rotated by a power source, and an apparatus 300 for providing an around view image, which is provided inside the vehicle 100.

The apparatus 300 may include at least one camera, and an image acquired by the at least one camera may be processed into a signal by a processor 350.

A trailer 900 may include wheels 903FR, 903FL, 903RL, . . . , which are rotated by travelling of the vehicle 100, a plurality of cameras, and a hitch 910 which connects the vehicle 100 and the trailer 900.

In some implementations, the trailer 900 described in this specification may be connected with the vehicle 100 by the hitch 910, and therefore enabled to move responsive to travel of the vehicle 100. When the vehicle 100 travels forward, the trailer 900 may travel forward accordingly. In addition, when the vehicle 100 comes to a stop or travels backwards, the trailer 900 may come to a stop or travel backwards accordingly. Responsive to rotation of the vehicle 100, the trailer 900 may rotate in a direction of the rotation of the vehicle 100.

The trailer 900 moves passively by movement of the vehicle 100.

For example, when the vehicle 100 moves in a specific direction, the trailer 900 connected with the vehicle 100 by the hitch 910 moves according to the movement of the vehicle 100.

Steering of the trailer 900 is related to steering of the vehicle 100.

In some implementations, a steering input may be made in a manner such that the front wheels of the trailer 900 are rotated to the left or right side in a direction of travel of the vehicle 100. A steering input for the front wheels of the trailer 900 may be provided from the apparatus 300.

Figure 2A:
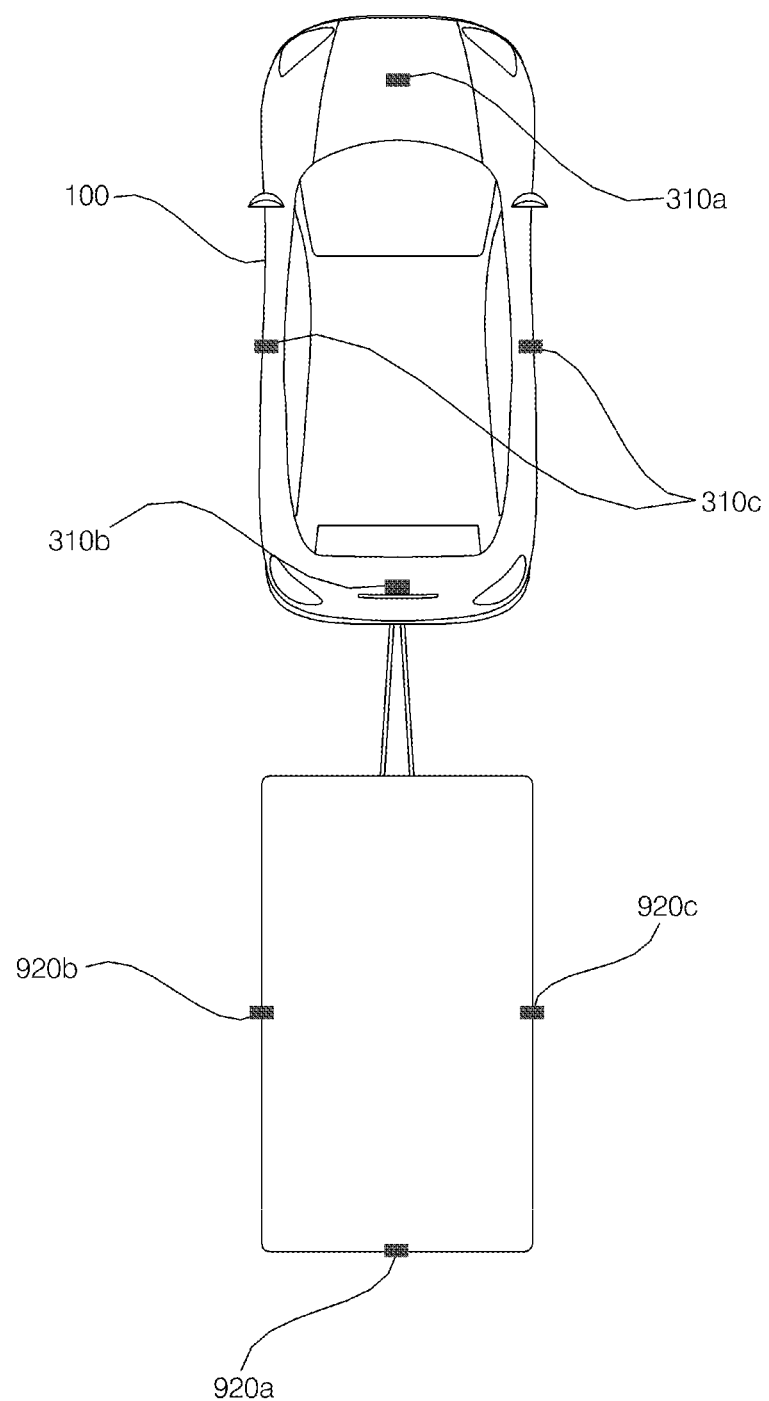
FIG. 2A is a diagram illustrating an example vehicle including one or more cameras and an example trailer.
Figure 2B:
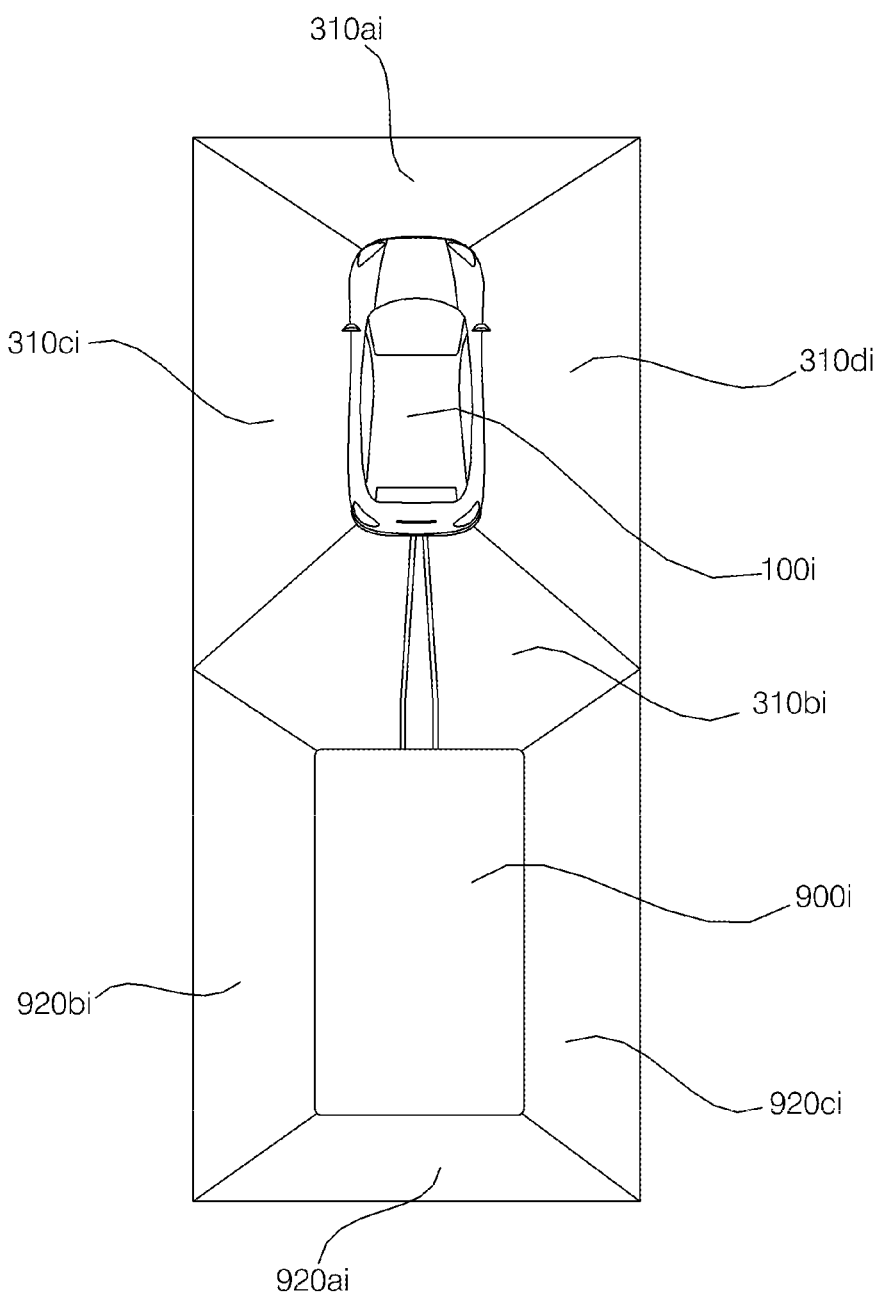
FIG. 2B is a diagram illustrating an example around view image for a vehicle and a trailer.

FIG. 2A illustrates an example vehicle including one or more cameras and an example trailer. FIG. 2B illustrates an example around view image for a vehicle and a trailer.

Referring to FIGS. 2A and 2B, there is provided description about an apparatus for providing an around view image, the apparatus which includes a plurality of cameras 310a, 310b, 310c, and 310d for acquiring a vehicle around image and a plurality of cameras 920a, 920b, and 920c for acquiring a trailer around image.

FIG. 2A illustrates a case where the apparatus 300 includes seven cameras, but the apparatus 300 can include any suitable numbers of cameras.

Referring to FIG. 2A, the apparatus 300 may include the plurality of cameras 310a, 310b, 310c, and 310d. The plurality of cameras 310a, 310b, 310c, and 310d included in the vehicle 100 may be disposed on the front of the vehicle 100, on the rear of the vehicle 100, on the left side of the vehicle 100, and on the right side of the vehicle 100.

The first camera 310a may be disposed on the front of the vehicle 100, the second camera 310b may be disposed on the rear of the vehicle 100, the third camera 310c may be disposed on the left side of the vehicle 100, and the fourth camera 310d may be disposed on the right side of the vehicle 100.

The first camera 310a may be disposed near an emblem or a radiator grill of the vehicle 100.

The second camera 310b may be disposed near a rear license plate or a trunk switch of the vehicle 100.

The third camera 310c may be disposed in at least one of the left front door, the left rear door, the left front fender, the left rear fender, the left side mirror, the left front wheel house, and the left rear wheel house of the vehicle 100.

The fourth camera 310d may be disposed in at least one of the right front door, the right rear door, the right front fender, the right rear fender, the right side mirror, the right front wheel house, and the right rear wheel house of the vehicle 100.

For example, the third camera 310c and the fourth camera 310d may be implemented as a bidirectional camera. The bidirectional camera is a camera which captures areas to the left and right of the vehicle 100 from a position where the camera is set up.

The bidirectional camera may be a module formed by two cameras, and may captures images in different directions from a position where the camera is attached to a vehicle. For example, if the third camera 310c is formed as a bidirectional camera, the third camera 310c may capture images of the right side and the rear side of the vehicle 100. For example, if the fourth camera 310d is formed as a bidirectional camera, the fourth camera 310d may capture images of the left side and the rear side of the vehicle 100.

In some implementations, the apparatus 300 may include the plurality of cameras 920a, 920b, and 920c attached to the trailer 900.

The plurality of cameras 920a, 920b, and 920c included in the trailer 900 may be respectively disposed on the rear of the trailer 900, the left side of the trailer 900, and the right side of the trailer 900.

The fifth camera 920a may be disposed on the rear of the trailer 900.

The sixth camera 920b may be disposed on the left side of the trailer 900.

The seventh camera 920c may be disposed on the right side of the trailer 900.

Each image captured by the camera 310 of the vehicle 100 and the camera 920 of the trailer 900 may be transferred to the processor 350, and the processor 350 may synthesize images to generate an image of the surroundings of the vehicle 100.

In some implementations, in some implementations, the plurality of cameras 920a, 920b, and 920c attached to the trailer 900 may be classified as elements of the trailer 900. In this case, the plurality of cameras 920a, 920b, and 930c may be electrically connected to an electric control device included in the trailer 900.

The processor 350 may receive images directly from the plurality of cameras 920a, 920b, and 920c attached to the trailer 900, or may receive images by way of the electric control device of the trailer 900 via an interface 330.

FIG. 2B shows an example of an image of the surroundings of a vehicle.

The image of the surroundings of the vehicle may include a first image area 310ai captured by the first camera 310a, a second image area 310bi captured by the second camera 310b, a third image area 310ci captured by the third camera 310c, a fourth image area 310di captured by the fourth camera 310d, a fifth image area 920ai captured by the fifth camera 920a, and a sixth image area 920bi captured by the sixth camera 920b, and a seventh image area 920ci captured by the seventh camera 920c.

In some implementations, if an around view image is generated using a plurality of cameras, a boundary may be seen between image areas. In some implementations, image blending may be performed to display the boundary unnoticeably.

In some implementations, the image of the surroundings of the vehicle may include a vehicle image 100i. The vehicle image 100i may be an image generated by the processor 350.

In addition, an image of the surroundings of a trailer may include a trailer image 900i. The trailer image 900i may be an image generated by the processor 350.

The image of the surroundings of the vehicle may be displayed through a display unit 141 of the vehicle 100 or a display unit 371 of the apparatus 300.

The image of the surroundings of the vehicle may be referred to as a vehicle around view image or an around view image of a vehicle.

The image of the surroundings of the vehicle may be generated based on images acquired by the first to fourth cameras 310a, 310b, 310c, and 310d.

The image of the surroundings of the vehicle may be generated based on images acquired by the first to seventh cameras 310a, 310b, 310c, 310d, 920a, 920b, and 930c. In this case, the image of the surroundings of the vehicle may include the vehicle 100i and the trailer image 900i.

Figure 3:
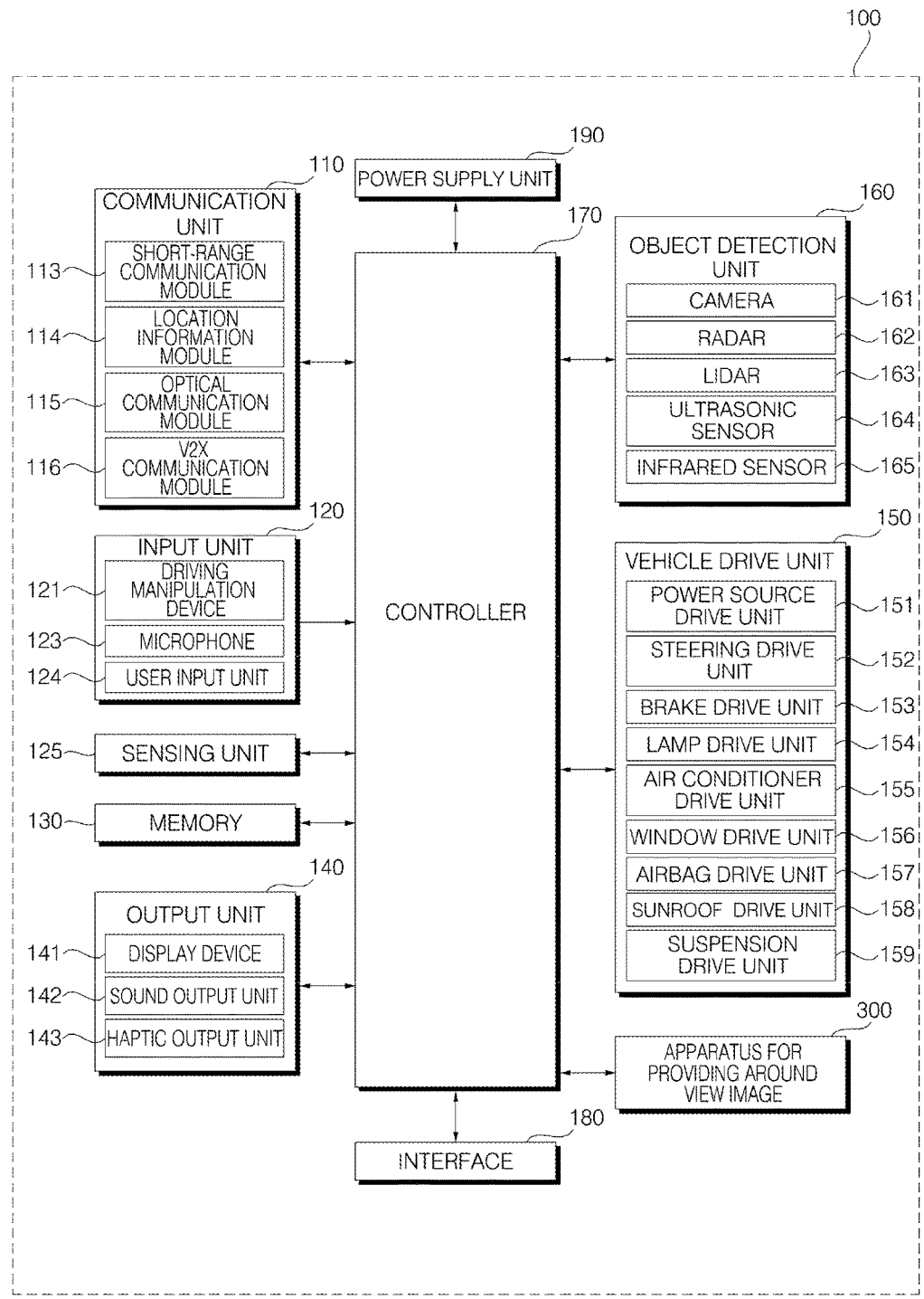
FIG. 3 is a diagram illustrating an example vehicle.

FIG. 3 illustrates an example vehicle.

Referring to FIG. 3, the vehicle 100 may include a communication unit, an input unit 120, a sensing unit 125, a memory 130, an output unit 140, a vehicle drive unit 150, an object detection unit 160, a control unit 170, an interface 180, a power supply unit 190, and the apparatus 300.

The communication unit 110 may include one or more modules which enables wireless communication between the vehicle 100 and a mobile terminal, between the vehicle 100 and an external server, or between the vehicle 100 and a different vehicle. In addition, the communication unit 110 may include one or more modules that connects the vehicle 100 to one or more networks.

The communication unit 110 may include a broadcast receiving module 111, a wireless internet module 112, a short-range communication module 113, a location information module 114, an optical communication module 115, and a V2X communication module 116.

The broadcast receiving module 111 may receive a broadcast signal or broadcast-related information from an external broadcast management server through a broadcasting channel. The term "broadcast" includes radio broadcast and TV broadcast.

The wireless internet module 112 is a module for a wireless internet access. The wireless internet module 112 may be embedded in the vehicle 100 or may be an external device. The wireless internet module 112 is configured to transmit and receive a wireless signal over a communication network according to wireless internet technologies.

The wireless internet technologies include, for example, Wireless LAN (WLAN), Wireless-Fidelity (Wi-Fi), Wireless Fidelity (Wi-Fi) Direct, Digital Living Network Alliance (DLNA), Wireless Broadband (WiBro), World Interoperability for Microwave Access (WiMAX), High Speed Downlink Packet Access (HSDPA), High Speed Uplink Packet Access (HSUPA), Long Term Evolution (LTE), Long Term Evolution-Advanced (LTE-A), etc. The wireless internet module 112 transmits and receives data according to at least one internet technology in a range including even technologies not mentioned above. For example, the wireless internet module 112 may wirelessly exchange data with an external server. The wireless internet module 112 may receive weather information and traffic information (e.g., a Transport Protocol Expert Group (TREG)) from the external server.

The short-range communication module 113 is configured to perform short-range communication. The short-range communication module 113 may support short-range communication using at least one selected from among Bluetooth™, Radio Frequency IDdentification (RFID), Infrared Data Association (IrDA), Ultra-WideBand (UWB), ZigBee, Near Field Communication (NFC), Wireless-Fidelity (Wi-Fi), Wi-Fi Direct, and Wireless USB (Wireless Universal Serial Bus).

The short-range communication module 113 may form wireless area networks to perform short-range communication between the vehicle 100 and at least one external device.

For example, the short-range communication module 113 may wirelessly exchange data with a mobile terminal. The short-range communication module 113 may receive weather information and traffic information (e.g., a Transport Protocol Expert Group (TPEG)) from the mobile terminal. For example, if a user is inside the vehicle 100, a mobile terminal of the user and the vehicle 100 may be paired with each other automatically or upon execution of an application by the user.

The location information module 114 is a module for acquiring a location of the vehicle 100, and the typical example thereof is a Global Positioning System (GPS) module. For example, by facilitating the GPS module, a vehicle is able to acquire a location of the vehicle using a signal transmitted by a GPS satellite.

The optical communication module 115 may include a light emitter unit and a light receiver.

The light receiver may receive information by converting a light signal into an electrical signal. The light receiver may include a Photo diode (PD) for receiving a light. The PD may convert a light into an electrical signal. For example, the light receiver may receive information on a vehicle ahead using a light that is emitted from a light source included in the vehicle ahead.

The light emitter may include at least one light emitting device for converting an electrical signal into a light signal. The light emitting device may be a Light Emitting diode (LED). The light emitter converts an electrical signal into a light signal and emits the light signal to the outside. For example, by flashing a light emitting device at a predetermined frequency, the light emitter may emit a light signal to the outside. In some implementations, the light emitter may include a plurality of light emitting device array. In some implementations, the light emitter may be integrally formed with a lamp provided in the vehicle 100. For example, the light emitter may be at least one of a headlamp, a tail lamp, a turn signal lamp, and a side lamp. For example, the optical communication module 115 may exchange data with a different vehicle using optical communication.

The V2X communication module 116 is a module for performing wireless communication with a server or a different vehicle. The V2X module 116 includes a module that is able to implement a protocol for Vehicle-to-Vehicle (V2V) communication and Vehicle-to-Infrastructure (V2I) communication. The vehicle 100 may perform wireless communication with an external server or the different vehicle by using the V2X communication module 116.

The input unit 120 may include a driving manipulation units 121, a microphone 123, and a user input unit 124.

The driving manipulation units 121 receives a user input for driving the vehicle 100. The driving manipulation units 121 may include a steering input units 121a, a shift input units 121b, an acceleration input units 121c, and a brake input units 121d.

The steering input units 121a may receive a user input with regard to the direction of travel of the vehicle 100. The steering input units 121a may take the form of a wheel to enable a steering input through the rotation thereof. In some implementations, the steering input units 121a may be provided as a touchscreen, a touch pad, or a button.

The shift input units 121b receives a user input for Parking (P), Drive (D), Neutral (N), and Reverse (R). The shift input units 121b may take the form of a lever. In some implementations, the shift input units 121b may take the form of a touch screen, a touch pad, or a button.

The acceleration input units 121c receives a user input for acceleration of the vehicle 100. The brake input units 121d may receive a user input for deceleration of the vehicle 100. Each of the acceleration input units 121c and the brake input units 121d may take the form of a pedal. In some implementations, the acceleration input units 121c or the break input units 121d may be configured as a touch screen, a touch pad, or a button.

The microphone 123 may convert an external sound signal into electrical data. The processed data may be utilized for various purposes according to a function performed by the vehicle 100. The microphone 123 may convert a voice command of a user into electrical data. The electrical data may be transferred to the controller 170.

In some implementations, in some implementations, the microphone 123 may be an element included not in the input unit 120, but in the sensing unit 125.

The user input unit 124 is configured to receive information from a user. Once information is received through the user input unit 124, the controller 170 may control the vehicle 100 to operate corresponding to the received information. The user input unit 124 may include a touch-type input units or a mechanical input units. In some implementations, the user input 124 may be disposed in one region of the steering wheel. In this case, a driver may manipulate the user input unit 124 while grabbing the steering wheel.

The sensing unit 125 sense a signal related to travel of the vehicle 100. To this end, the sensing unit 125 may include a collision sensor, a wheel sensor, a speed sensor, a gradient sensor, a weight sensor, a heading sensor, a yaw sensor, a gyro sensor, a position module, a vehicle forward/reverse movement sensor, a battery sensor, a fuel sensor, a tire sensor, a steering sensor based on the rotation of the steering wheel, an in-vehicle temperature sensor, an in-vehicle humidity sensor, a rain sensor, an ultrasonic sensor, a radar, a Light Detection And Ranging (LIADAR), etc.

The sensing unit 125 may acquire sensing signals with regard to, for example, vehicle collision information, vehicle driving direction information, vehicle location information (GPS information), vehicle angle information, vehicle speed information, vehicle acceleration information, vehicle tilt information, vehicle forward/reverse movement information, battery information, fuel information, tire information, vehicle lamp information, in-vehicle temperature information, in-vehicle humidity information, information as to whether it is raining, steering-wheel rotation angle information, etc.

In some implementations, the sensing unit 125 may further include, for example, an accelerator pedal sensor, a pressure sensor, an engine speed sensor, an Air Flow-rate Sensor (AFS), an Air Temperature Sensor (ATS), a Water Temperature Sensor (WTS), a Throttle Position Sensor (TPS), a Top Dead Center (TDC) sensor, and a Crank Angle Sensor (CAS).

The sensing unit 125 may include a biometric information detection unit. The biometric information detection unit detects biometric information of a passenger and acquires the detected biometric information. The biometric information may include fingerprint information, Iris-scan information, Retina-scan information, hand geometry information, facial recognition information, voice recognition information, etc. The biometric information detection unit may include a sensor for sensing biometric information of a passenger. An internal camera and the microphone 123 may operate as the sensor. The biometric information detection unit may acquire hand geometry information and facial recognition information by using the internal camera.

The output unit 140 is configured to output information processed by the controller 170, and may include a display device 141, a sound output unit 142, and a haptic output unit 143.

The display device 141 may display information processed by the controller 170. For example, the display device 141 may display vehicle related information. The vehicle related information may include vehicle control information required for direct control of a vehicle, or driver assistant information for providing guide to a driver. In addition, the vehicle related information may include vehicle condition information indicating the current condition of the vehicle, and vehicle operation information related to operation of the vehicle.

The display device 141 may include at least one of the following: a Liquid Crystal Display (LCD), a Thin Film Transistor-Liquid Crystal Display (TFT LCD), an Organic Light-Emitting Diode (OLED), a flexible display, a 3D display, and an e-ink display.

The display device 141 may form an inter-layer structure together with a touch sensor, or may be integrally formed with the touch sensor to implement a touch screen. The touch screen may function as the user input unit 124 which provides an input interface between the vehicle 100 and a user, and may at the same time provide an output interface between the vehicle 100 and the user. In this case, to receive a control command according to a touch input, the display device 141 may include a touch sensor which senses a touch on the display device 141. When a touch is made on the display device 141, the touch sensor may sense the touch and the controller 170 may generate a control command corresponding to the touch. Content input by the touch may be a text, a number, instruction in various modes, and a menu item able to be designated.

In some implementations, the display device 141 may include a cluster to allow a driver to check vehicle condition information or vehicle operation information while driving the vehicle 100. The cluster may be disposed on a dashboard. In this case, the driver may check information displayed on the cluster with his or her eyes looking forward.

In some implementations, in some implementations, the display device 141 may be implemented as a Head Up Display (HUD). When implemented as an HUD, the display device 141 may output information through a transparent display provided in a windshield. Alternatively, the display device 141 may include a projector module to output information through an image projected on a windshield.

The sound output unit 142 may convert an electrical signal from the controller 170 into an audio signal, and output the audio signal. The sound output unit 142 may include a speaker and the like. The sound output unit 142 may output sound corresponding to operation of the user input unit 124.

The haptic output unit 143 generates a tactile output. For example, the haptic output unit 143 may vibrate a steering wheel, a seat belt, or a seat so as to allow a user to recognize the output.

The vehicle drive unit 150 may control operation of various devices of the vehicle 100. The vehicle drive unit 150 may receive a control signal from the apparatus 300. The vehicle drive unit 150 may control each device of the vehicle based on the control signal.

The vehicle drive unit 150 may include a power source drive unit 151, a steering drive unit 152, a brake drive unit 153, a lamp drive unit 154, an air conditioner drive unit 155, a window drive unit 156, an airbag drive unit 157, a sunroof drive unit 158, and a suspension drive unit 159.

The power source unit 151 may perform an electronic control of a power source provided in the vehicle 100.

For example, when a fossil fuel-based engine is the power source, the power source drive unit 151 may perform electronic control of the engine. By doing so, the power source drive unit 151 may control the output torque of the engine. When the power source drive unit 151 is an engine, the power source drive unit 151 may adjust the output toque of the engine under control of the controller 170, thereby adjusting the speed of the vehicle 100.

In another example, when an electrical motor is the power source, the power source drive unit 151 may perform control of the motor. By doing so, the power source drive unit 151 may control a rotation speed and an output torque of the motor.

The power source unit 151 may receive an acceleration control signal from the apparatus 300. The power source drive unit 151 may receive a power source in accordance with the received acceleration control signal.

The steering drive unit 152 may perform electric control of a steering apparatus provided inside the vehicle 100. By doing so, the steering drive unit 152 may change a direction of travel of the vehicle 100. The steering drive unit 152 may receive a steering control signal from the apparatus 300. The steering drive unit 152 may control the steering apparatus in accordance with the received steering control signal.

The brake drive unit 153 may perform electric control of a brake apparatus provided inside the vehicle 100. For example, the brake drive unit 153 may reduce the speed of the vehicle 100 by controlling operation of a brake located at a wheel. In another example, the brake drive unit 153 may adjust a direction of travel of the vehicle 100 to the left or the right by controlling a brake located at a left wheel and a brake located at a right wheel to operate differently. The brake drive unit 153 may receive a deceleration control signal from the apparatus 300. The brake drive unit 153 may control the brake apparatus in accordance with the received deceleration control signal.

The lamp drive unit 154 may control turning on/off of lamps provided inside and outside the vehicle 100. In addition, the lamp drive unit 154 may control intensity and direction of light of the lamps. For example, the lamp drive unit 154 may control a turn signal lamp and a brake lamp.

The air conditioner drive unit 155 may perform electric control of an air conditioner provided inside the vehicle 100. For example, when in-vehicle temperature is high, the air conditioner drive unit 155 may operate the air conditioner so as to supply cool air to the inside of the vehicle 100.

The window drive unit 156 may perform electric control of a window apparatus provided inside the vehicle 100. For example, the window drive unit 156 may control opening or closing of left and right windows provided on the sides of the vehicle 100.

The airbag drive unit 157 may perform electric control of an airbag apparatus provided inside the vehicle 100. For example, upon detection of a dangerous situation, the airbag drive unit 157 may control an airbag to be deployed.

The sunroof drive unit 158 may perform electric control of a sunroof apparatus provided inside the vehicle 100. For example, the sunroof drive unit 158 may control opening or closing of a sunroof.

The suspension drive unit 159 may perform electric control of a suspension apparatus provided inside the vehicle 100. For example, when the road surface is uneven, the suspension drive unit 159 may control the suspension apparatus so as to reduce vibration of the vehicle 100. The suspension drive unit 159 may receive a suspension control signal from the apparatus 300. The suspension drive unit 159 may control the suspension apparatus in accordance with the received suspension control signal.

The memory 130 is electrically connected with the controller 170. The memory 130 may store basic data for each unit, control data for the operational control of each unit, and input/output data. The memory 130 may be any of various hardware storage devices, such as a ROM, a RAM, an EPROM, a flash drive, and a hard drive. The memory 130 may store various data for the overall operation of the vehicle 100, such as programs for the processing or control of the controller 170.

The object detection unit 160 is configured to detect an object located outside the vehicle 100. For example, the object may include a pedestrian, a two-wheeled vehicle, a different vehicle, and a structure located around the vehicle 100. The structure may be a wall, a roadside tree, a traffic light, a pole, or any object fixed onto the ground.

The object detection unit 160 may include a camera 161, a radar 162, a lidar 163, an ultrasonic sensor 164, and an infrared sensor 165.

In some implementations, the object detection unit 160 may further include other components in addition to the aforementioned components, or may not include some of the aforementioned components.

The camera 161 may be located at an appropriate position outside the vehicle 100 in order to acquire an image of the outside of the vehicle 100. The camera 161 may be a mono camera, a stereo camera, an Around View Monitoring (AVM) camera, or a 360-degree camera.

The radar 162 may include an electromagnetic wave transmitter and an electromagnetic wave receiver. The radar 162 may be realized as a pulse radar or a continuous wave radar depending on the principle of emission of an electronic wave. In addition, the radar 162 may be realized as a Frequency Modulated Continuous Wave (FMCW) type radar or a Frequency Shift Keying (FSK) type radar depending on the waveform of a signal.

The radar 162 may be located at an appropriate position outside the vehicle 100 in order to detect an object located in front of the vehicle, an object located to the rear of the vehicle 100, or an object located to the side of the vehicle.

The lidar 163 may include a laser transmitter and a laser receiver. The lidar 163 may be implemented based on TOF techniques or phase-shift techniques.

The lidar 163 may detect an object through the medium of laser light by employing the TOF techniques or the phase-shift techniques, and may detect a location of the detected object, the distance to the detected object, and the speed relative to the detected object.

The lidar 163 may be located at an appropriate position outside the vehicle 100 in order to detect an object in front of the vehicle 100, an object located to the rear of the vehicle 100, or an object located to the side of the vehicle 100.

The ultrasonic sensor 164 may include an ultrasonic wave transmitter and an ultrasonic wave receiver. The ultrasonic sensor 164 may detect an object based on an ultrasonic wave, and may detect a location of the detected object, the distance to the detected object, and the speed relative to the detected object.

The ultrasonic sensor 164 may be located at an appropriate position to detect an object located in front of the vehicle 100, an object located to the rear of the vehicle 100, and an object on the side of the vehicle 100.

The infrared sensor 165 may include an infrared light transmitter and an infrared light receiver. The infrared sensor 165 may detect an object based on an infrared light, and detect a location of the detected object, the distance to the detected object, and the speed relative to the detected object.

The infrared sensor 165 may be located at an appropriate position outside the vehicle 100 in order to detect an object in front of the vehicle 100, an object located to the rear of the vehicle 100, and an object located to the side of the vehicle 100.

The controller 170 may control the overall operation of each unit inside the vehicle 100. The controller 170 may be referred to as an Electronic Controller (ECU).

The controller 170 may be implemented using at least one selected from among Application Specific Integrated Circuits (ASICs), Digital Signal Processors (DSPs), Digital Signal Processing Devices (DSPDs), Programmable Logic Devices (PLDs), Field Programmable Gate Arrays (FPGAs), processors, controllers, micro-controllers, microprocessors, and electric units for the implementation of other functions.

The interface 180 may server as a passage for various kinds of external devices that are connected with the vehicle 100. For example, the interface 180 may have a port that is connectable to a mobile terminal, and may be connected with the mobile terminal via the port. In this case, the interface 180 may exchange data with the mobile terminal.

In some implementations, the interface 180 may serve as a passage for the supply of electrical energy to the mobile terminal connected thereto. When the mobile terminal is electrically connected with the interface 180, the interface 180 may provide electrical energy, supplied from the power supply unit 190, to the mobile terminal under control of the controller 170.

The power supply unit 190 may supply power required to operate each component under control of the controller 170. In particular, the power supply unit 190 may be supplied with power from, for example, a battery inside the vehicle 100.

The apparatus 300 may exchange data with the controller 170. Various information, data, or control signals generated in the apparatus 300 may be output to the controller 170.

Figure 4:
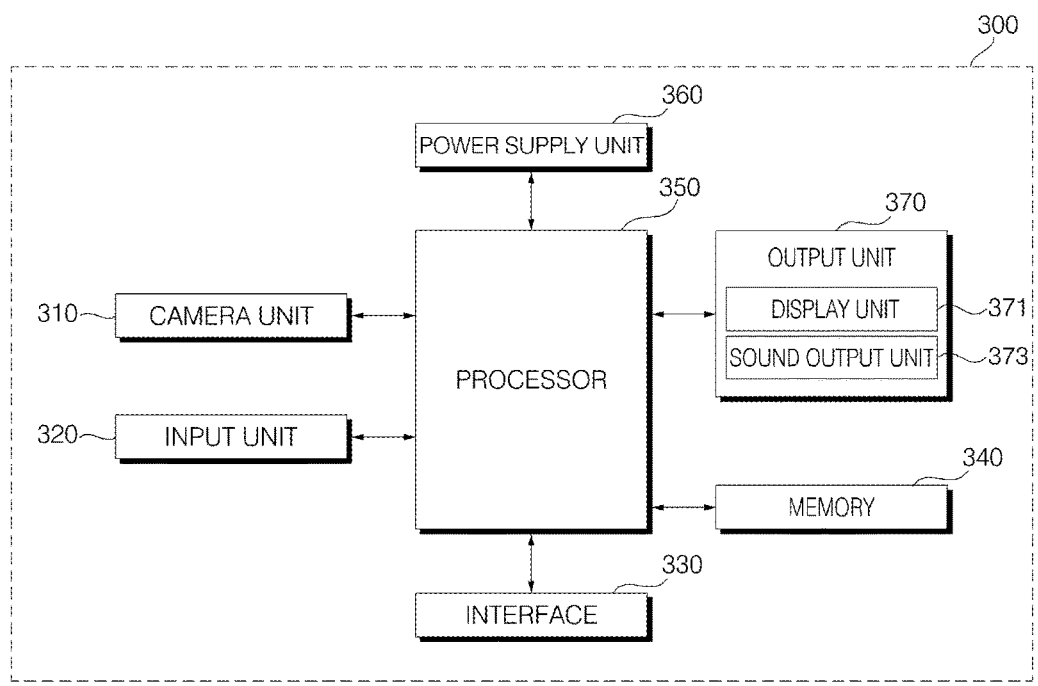
FIG. 4 is a diagram illustrating an example apparatus for providing an around view image of a vehicle.

FIG. 4 illustrates an example apparatus for providing an around view image of a vehicle.

Referring to FIG. 4, the apparatus 300 may include a camera unit 310, an input unit 320, an interface 330, a memory 340, a processor 350, a power supply unit 360, and an output unit 370.

The camera unit 310 may include a plurality of cameras 310a, 310b, 310c, 310d, 920a, 920b, and 920c.

The plurality of cameras 310a, 310b, 310c, 310d, 920a, 920b, and 920c may be attached to one region of a vehicle or a trailer.

The camera unit 310 may acquire an image from the plurality of cameras 310 included in the vehicle. The image may be an image of the surroundings of the vehicle. Alternatively, the image may be an image of the surroundings of the trailer.

For example, the camera unit 310 may acquire a front view image, a rear view image, a left view image, and a right view image of the vehicle 100 using the plurality of cameras 310a, 310b, 310c, and 310d. The camera unit 310 may acquire an image of the surroundings of the trailer using the plurality of cameras 920a, 920b, and 920c. The image of the surroundings of the trailer may be an image that is taken at the center of the trailer. The camera unit 310 may acquire a rear view image, a left view image, and a right view image of the trailer.

The input unit 320 may include a plurality of buttons or a touch screen. Using the plurality of buttons or the touch screen, it is possible to turn on the apparatus 300. Other various input operations are possible using the input unit 320. In some implementations, in some implementations, the input unit 320 may include a voice input unit for receiving a voice of a user. In this case, the voice input unit may include a microphone for converting voice of a user into an electrical signal.

The interface 330 may receive vehicle related data or transmit a signal processed or generated by the processor 350 to the outside. To this end, the interface 330 may perform data communication with the controller 170, the output unit 140, the sensing unit 125, the vehicle drive unit 150, and the trailer 900 in a wired or wireless communication method.

In some implementations, the interface 330 may receive sensor information from the controller 170 or the sensing unit 125.

The sensor information may include at least one of the following: vehicle direction information, vehicle location information (GPS information), vehicle angle information, vehicle speed information, vehicle acceleration information, vehicle tilt information, vehicle forward/reverse movement information, battery information, fuel information, tire information, vehicle lamp information, in-vehicle temperature information, in-vehicle humidity information, information as to whether it is raining, etc.

The sensor information may be acquired from a yaw sensor, a gyro sensor, a position module, a vehicle forward/reverse movement sensor, a wheel sensor, a vehicle speed sensor, a vehicle tilt sensor, a battery sensor, a fuel sensor, a tire sensor, a steering sensor based on the rotation of the steering wheel, an in-vehicle temperature sensor, an in-vehicle humidity sensor, a rain sensor, a GPS sensor, etc.

In some implementations, information related to travel of a vehicle in the above sensor information, such as the vehicle direction information, the vehicle location information, the vehicle angle information, the vehicle speed information, and the vehicle tilt information, may be referred to as vehicle driving information.

The Interface 330 may provide a signal to the controller 170 or the vehicle drive unit 150. The signal may be a control signal. For example, the processor 350 may generate and provide an acceleration control signal to the power source drive unit 751. For example, the processor 350 may generate and provide a steering control signal to the steering drive unit 752 through the interface 330. For example, the processor 350 may generate and provide a deceleration control signal to the brake drive unit 753.

The interface 330 may receive steering angle information from a steering angle sensor included in the sensing unit 125 of the vehicle 100.

The interface 330 may receive location information of vehicle 100 from the GPS sensor included in the sensing unit 125 of the vehicle 100 or from the location information module 714 included in the communication unit 110.

The interface 330 may receive vehicle speed information from the vehicle speed sensor included in the sensing unit 125 of the vehicle 100.

The interface 330 may receive data from the trailer 900.

The trailer 900 may include an electronic control device. The interface 330 may be electrically connected with the electronic control device of the trailer 900.

The interface 330 may receive data from the electronic control device of the trailer 900.

The interface 330 may transfer a control signal, generated by the processor 350, to the electronic control device of the trailer 900.

For example, the interface 330 may transfer a control signal for controlling a steering angle of a wheel of the trailer 900.

The interface 330 may receive, from the trailer, location information and direction information of the trailer 900 sensed by the gyro sensor included in the trailer 900.

The interface 330 may receive images of the surroundings of the trailer 900 from the cameras 920a, 920b, and 930c disposed in the trailer 900.

The interface 330 may receive sensing information of the surroundings of the trailer 900 from a sensor, other than a camera, included in the trailer 900.

For example, at least one sensor among a radar, a lidar, an ultrasonic sensor, and an infrared sensor may be disposed in the trailer 900. The interface 399 may receive sensing information from at least one sensor among the radar, the lidar, the ultrasonic sensor, and the infrared sensor disposed in the trailer 900.

The interface 330 may receive information on detection of an object located outside the vehicle 100 from the object detection unit 160.

The interface 330 may provide a hitch control signal generated by the processor 350 to a hitch 910.

The interface 330 may provide the vehicle drive unit 150 with a vehicle control signal including at least one control signal among an acceleration control signal, a brake control signal, and a steering control signal.

The interface 330 may provide at least one control signal between a brake control signal and a steering control signal to the trailer 900.

The memory 340 may store various types of data for processing or control of the processor 350 for the purpose of overall operation of the apparatus 300.

The memory 340 may store data for determining an attitude of the trailer 900.

For example, the memory 240 may store attitude data of the trailer 900, which is generated corresponding to a state in which the trailer 900 is aligned with the vehicle 100. The attitude data may be referred to as markers.

For example, the memory 340 may store attitude data of the trailer 900 in an image of the vehicle 100 which is taken looking from the rear of the vehicle 100 toward the trailer 900 when the vehicle 100 and the trailer 900 are aligned in an overall-length direction of the vehicle 100.

For example, the memory 340 may image data in which an area corresponding to a feature point (e.g., an edge and a surface) of the exterior appearance of the trailer 900 is matched with a dot, a line, or a surface. The area corresponding to the feature point, which is matched with a dot, a line, or a surface, may be referred to as a marker.

In addition, the memory 340 may store location information and direction information of the trailer 900 sensed by the gyro sensor in a state in which the trailer 900 is arranged with the vehicle 100.

The memory 340 may store information on attitudes of the trailer 900.

The memory 340 may store a plurality of Look Up Tables (LUTs) that are generated in advance corresponding to information on attitudes of the trailer 900.

For example, the memory 340 may store a first LUT corresponding to a first attitude of the trailer 900, a second LUT corresponding to a second attitude of the trailer 900, and a third LUT corresponding to a third attitude of the trailer 900.

An attitude of the trailer 9000 may be determined by a connection state between the vehicle 100 and the trailer 900.

For example, an attitude of the trailer 900 may be determined by how the trailer 900 is positioned with respect to the vehicle 100 in an overall-length direction of the vehicle 100. For example, an attitude of the trailer 900 may be determined by how the vehicle 100 and the trailer 900 are connected when seen from above.

The memory 340 may store data required for identifying an object. For example, when a specific object is detected from an image acquired by the camera unit 310, the memory 340 may store data required for identifying the object using a specific algorithm.

In some implementations, the memory 340 may be any of various hardware storage devices, such as a ROM, a RAM, an EPROM, a flash drive, and a hard drive.

The processor 350 may control the overall operation of each unit inside the apparatus 300.

The processor 350 may process an image of the surroundings of the vehicle 100 received from the camera unit 310. In particularly, the processor 350 performs computer vision-based signal processing. The processor 350 may detect and track an object. In particular, when an object is detected, the processor 350 may perform Lane Detection (LD), Vehicle Detection (VD), Pedestrian Detection (PD), Brightspot Detection (BD), Traffic Sign Recognition (TSR), and road surface detection.

The processor 350 may detect information from an image of the surroundings of the vehicle 100, the image which is received from the camera unit 310.

The information may be information on a vehicle driving situation. For example, the information may include information on a road on which a vehicle is travelling, traffic regulation information, information on a nearby vehicle, information on a vehicle or a crosswalk light, information on a construction site, traffic flow information, parking space information, lane information, etc.

The processor 350 may verify detected information by comparing the detected information with information stored in the memory 340.

In some implementations, the processor 350 may in real time recognize traffic information which is recognized by the apparatus 300 from an image.

In some implementations, the processor 350 may receive sensor information from the controller 170 or the sensor unit 125 via the interface 330. The sensor information may include at least one of vehicle direction information, vehicle location information (GPS information), vehicle angle information, vehicle speed information, vehicle acceleration information, vehicle tilt information, vehicle forward/reverse movement information, battery information, fuel information, tire information, vehicle lamp information, in-vehicle temperature information, in-vehicle humidity information, steering wheel rotation information, etc.

The processor 350 may determine a connection state between the trailer 900 and the vehicle 100.

The processor 350 may determine a connection state between the trailer 900 and the vehicle 100 on the basis that the trailer 900 and the vehicle are connected electrically.

The processor 350 may determine a connection state between the trailer 900 and the vehicle 100 based on an image acquired by the camera unit 310.

The processor 350 may determine a connection state between the trailer 900 and the vehicle 100 based on sensing information of the trailer 900, which is detected by the object detection unit 160.

The processor 350 may determine a connection state between the trailer 900 and the vehicle 100 based on a user input received via the input unit 320.

If the vehicle 100 and the trailer 900 are connected electrically, the processor 350 may receive data, information, and signals from the trailer 900.

The information received from the trailer 900 may include trailer image information, trailer direction information, trailer location information (GPS information), trailer angle information, trailer speed information, trailer acceleration information, trailer tilt information, and trailer lamp information.

In some implementations, if a trailer is detected from a rear view image of the vehicle 100, which is provided from the camera unit 310, and data is transmitted to the trailer, the processor 350 may determine that the trailer is connected with the vehicle.

In some implementations, if the vehicle 100 connected with the trailer 900 is travelling in a designated area, the processor 350 may estimate a length of the trailer 900.

For example, when the vehicle 100 connected with the trailer 900 passes a predetermined range area, the processor 350 may estimate the length of the trailer 900 by calculating the time that it takes for the vehicle 100 to pass the area.

The processor 350 may receive data from the trailer 900 via the interface 330.

If the vehicle 100 and the trailer 900 are connected with each other, the processor 350 may receive trailer shape information from the trailer 900. The trailer shape information is information on measurements of the exterior appearance of the trailer 900, including a length, a width, and a height thereof.

The processor 350 may receive the trailer shape information based on a user input received via the input unit 320.

If the vehicle 100 and the trailer 900 are connected with each other, the processor 350 may determine the shape of the trailer 900 by receiving sensing information from the sensing unit 125.

For example, in order to sense the length of the trailer 900, the processor 350 may determine a length of the trailer 900 based on location information which is generated when the trailer 900 is travelling in a designated area.

When data is received from the trailer 900 via the interface 330, the processor 350 may determine that the vehicle 100 and the trailer 900 are connected with each other.

In some implementations, when data is not received from the trailer 900 via the interface 300, the processor 350 may determine that the vehicle 100 and the trailer 900 are not in a connected state.

The processor 350 may determine an attitude of the trailer 900 based on an image received from the camera unit 310.

The attitude of the trailer 900 is data that includes an angle difference between the overall-length direction of the vehicle 100 and the overall-length direction of the trailer 900, and a distance between the rear of the vehicle 100 and the front of the trailer 900.

The attitude of the trailer 900 may indicate a state in which the trailer 900 is connected with the vehicle 100.

For example, an attitude of the trailer 900 may be a state in which the trailer 900 is, when seen from above, connected with the vehicle 100.

For example, an attitude of the trailer 900 may be determined on the basis that the vehicle 100 and the trailer 900 are aligned in the overall length direction.

For example, an attitude of the trailer 900 may be a state in which the trailer 900 is, when seen from above, not bent with respect to the vehicle 100 and the direction of travel of the vehicle 100.

For example, the attitude of the trailer 900 may be a state in which the trailer is, when seen from above, bent at a specific angle to the left with respect to the vehicle 100 and the direction of travel of the vehicle 100.

For example, the attitude of the trailer 900 may be a state in which the trailer 900 is, when seen from above, bent at a specific angle to the right with respect to the vehicle 100 and the direction of travel of the vehicle 100.

The processor 350 may detect the trailer 900 from an image provided by the rear view camera 310b included in the camera unit 310. The processor 350 may detect the trailer 900, connected with the vehicle 100, from a second image acquired by a second camera included in the camera unit 310.

The processor 350 may receive markers from the memory 340.

The markers may be reference data used as a criterion to determine an attitude of the trailer 900.

The markers may be reference data that is generated based on an image of the trailer 900 which is taken looking from the rear of the vehicle 100 toward the trailer 900 when the trailer 900 is aligned with the vehicle 100. Specifically, a maker may be formed by matching a dot, line, or surface with a feature point of the image of the trailer 900 in a rear view image of the vehicle 100. Such a marker may be generated as a default or by user settings.

The markers may include a front marker 1011 matching the lower edge of the front side of the detected trailer 900, a left marker 1013 matching the left edge of the front side of the trailer 900, and a right marker 1015 that matches the right edge of the front side of the trailer 900.

The processor 350 may match markers with a trailer image that is detected from an image provided by the camera unit 310.

The processor 350 may match a preset marker, stored in the memory 340, with the image of the detected trailer 900.

For example, the processor 350 may match the front marker 1011 with the lower edge of the front side of the detected trailer 900. The processor 350 may match the left marker 1013 with the left edge of the front side of the detected trailer 900. The processor 350 may match the right marker 1015 with the right edge of the front side of the detected trailer 900.

The processor 350 may overlay the markers on the rear view image of the vehicle 100 and then compare the markers overlaid on the rear image of the vehicle 100 with markers in the trailer image to determine an attitude of the trailer.

For example, the processor 350 may determine an attitude of the trailer 900 by comparing feature points of the trailer 900 with the markers. Specifically, the processor 350 may determine an attitude of the trailer 900 by comparing a marker corresponding to an upper right edge of the trailer 900 with an area occupied by an upper right edge of the trailer 900 in an acquired image. Alternatively, the processor 350 may determine an attitude of the trailer 900 by comparing a marker corresponding to an upper left edge of the trailer 900 with an area occupied by a upper left edge of the trailer 900 in an acquired image.

The processor 350 may determine an attitude of the trailer 900 based on an angle which is formed when the markers match the image of the trailer 900.

For example, the processor 350 may match the front marker 1011 in parallel with the lower edge of the front side of the trailer 900, and then determine an attitude of the trailer 900 based on an angle between the left marker 1013 and the left edge of the front side of the trailer 900 and an angle between the right marker 1015 and the right edge of the front side of the trailer 900.

For example, the processor 350 may match the left marker 1013 in parallel with the left edge of the front side of the trailer 900, and then determine an attitude of the trailer 900 based on an angle between the front marker 1011 and the lower edge of the front side of the trailer 900 and an angle between the right marker 1015 and the right edge of the front side of the trailer 900.

For example, the processor 350 may match the right marker 1015 in parallel with the right edge of the front side of the trailer 900, and then may determine an attitude of the trailer 900 based on an angle between the front marker 1011 and the lower edge of the front side of the trailer 900 and an angle between the left marker 1013 and the left edge of the front side of the trailer 900.

The processor 350 may determine an attitude of the trailer 900, by receiving an image including the trailer 900 from the memory 340 and comparing the received image with an image provided by the rear view camera of the vehicle 100.

The processor 350 may receive gyro sensing information from the trailer 900 via the interface 330. The gyro sensing information may include location information and direction information sensed by the gyro sensor included in the trailer 900.

The gyro sensor may be disposed in one region of the trailer 900. One or more gyro sensors may be provided. For example, at least one gyro sensor may be disposed in the upper left region, the lower left region, the upper right region, and the upper lower region of the trailer 900.

The processor 350 may determine an attitude of the trailer 900 based on location information and direction information of the trailer 900.

The processor 350 may receive, from the memory 340, a reference value that is sensed by the gyro sensor when the vehicle 100 and the trailer 900 are aligned.

The processor 350 may receive gyro sensing information including location information and direction information from the trailer 900.

The processor 350 may determine an attitude of the trailer 900 based on the gyro sensing information and the current gyro sensing information of the trailer 900 which are provided from the memory 340.

The processor 350 may generate an around view image by combining a plurality of images provided by the camera unit 310.

The around view image is a view which is generated by combining a front view image, a rear view image, a left view image, and a right view image of the vehicle 100 using a plurality of cameras. The around view image may be a top-view image. The around view image may include an image 300i of the vehicle 100. The image 300i of the vehicle 100 may be an image generated by the processor 350.

The processor 350 may generate an around view image of the vehicle 100 and the trailer 900 based on an around view image including an image of the vehicle 100.

The around view image including the vehicle 100 and the trailer 900 is an image that is generated by combining a front view image, a rear view image, a left view image, a right view image of the vehicle 100, and a left view image, a right view image, and a rear view image of the trailer 900 using a plurality of cameras.

When a blind spot occurs in an existing around view image of a vehicle because the trailer 900 is connected with the vehicle 100, the processor 350 may correct the around view image based on the blind spot.

For example, if the third camera 310c and the fourth camera 310d are a bidirectional camera, the processor 350 may receive, from the third camera 310c, a third image area 310ci including a blind spot occurring in the presence of the trailer 900. The processor 350 may be provided by the fourth camera 310d with a fourth image area 310di including the blind spot occurring in the presence of the trailer 900.

For example, if a mirror is attached to one region of the vehicle 100 to illuminate the blind spot, the processor 350 may receive a third image area 310ci acquired by the third camera 310c through the mirror, which includes the blind spot occurring in the presence of the trailer 900. The processor 350 may receive a fourth image area 310di acquired by the camera 310d through the mirror, which includes the blind spot occurring in the presence of the trailer 900.

The processor 350 may receive a fifth image area 920ai from the fifth camera 920a disposed at the rear side of the trailer 900.

The processor 350 may generate an around view image including the vehicle 100 and the trailer 900, by combining a plurality of images acquired by a plurality of cameras included in the trailer 900.

The processor 350 may receive an image of the surroundings of the trailer 900 from a plurality of cameras 920 included in the trailer 900 via the interface 330.

The image of the surroundings of the trailer 900 may include a rear view image of the trailer 900 received from the fifth camera 920a, a left view image of the trailer 900 received from the sixth camera 920b, and a right view image of the trailer 900 received from the seventh camera 920c.

The processor 350 may generate an around view image of the vehicle 100 and the trailer 900 by combining the image of the surroundings of the trailer 900 with an around view image which further includes an image of the vehicle 100.

The processor 350 may combine the image of the surroundings of the trailer 900 with the around view image including the vehicle 100 based on feature points of an area which is overlaid on the image of the surroundings of the trailer 900. For example, the processor 350 may detect common feature points from an area in which the third image acquired by the third camera and the second image acquired by the sixth camera overlap each other. The processor 350 may combine the third image and the sixth image based on the common feature points.

In this manner, the processor 350 may generate an around view image including the vehicle 100 and the trailer 900 by combining a plurality of images acquired by the vehicle 100 and the trailers 900. In some implementations, the around view image may include a vehicle image 100i and a trailer image 900i.

The vehicle image 100i may be an image generated by the processor 350. In addition, the trailer image 900i may be an image generated by the processor 350.

The processor 350 may generate an around view image of the vehicle 100 and the trailer 900 based on sensing information that is output from at least one sensor among the radar, the lidar, the ultrasonic sensor, and the infrared sensor.

The processor 350 may receive sensing information from the trailer 900 via the interface 330, the sensing information which is output from at least one sensor among the radar, the lidar, the ultrasonic sensor, and the infrared sensor. The sensing information may include information as to whether an object is detected, a location of the detected object, the distance to the detected object, and the speed relative to the detected object.

The processor 350 may generate an around view image including the vehicle 100 and the trailer 900 based on the sensing information.

When there is a blind spot in an image received from the camera, the processor 350 may correct the around view image based on the sensing information.

The processor 350 may distinguish a region corresponding to an around view image generated based on the sensing information from a region of an around view image generated based on image information. The processor 350 may generate and provide the corrected around view image to the output unit 370.

The processor 350 may receive, from the memory 340, a plurality of LUTs that are generated in advance corresponding to attitudes of the trailer 900.

The LUTs are data for storing image coordinates and composite image regions which are changed corresponding to a plurality of attitudes of the trailer 900 in order to generate an around view image based on an image provided by the camera unit 310.

When an attitude of the trailer 900 is changed, the processor 350 may generate an around view image of the vehicle 100 and the trailer 900 based on an LUT corresponding to the current attitude.

When an attitude of the trailer 900 is changed, the processor 350 may receive an LUT corresponding to the current attitude of the trailer 900 among a plurality of LUTs stored in the memory 140. The processor 350 may generate and provide an around view image corresponding to the current attitude of the trailer 900 based on a selected LUT.

For example, when the trailer 900 is connected with the vehicle 100 in such a way that the trailer 900 is bent to the left with respect to the direction of travel of the vehicle 100, the processor 350 may receive an LUT corresponding to an attitude of the trailer 900 from the memory 340. Based on the LUT, the processor 350 may generate and provide an around view image including the trailer 900 in a leftward bent position.

For example, if the trailer 900 is connected with the vehicle 100 in a state where the trailer 900 is bent to the right with respect to the direction of travel of the vehicle 100, the processor 350 may be provided by the memory 340 with a lookup table corresponding to the attitude of the trailer 900. Based on the lookup table, the processor 350 may generate and provide an around view image including the trailer 900 in a rightward bent position.

The processor 350 may generate a signal for controlling travel of the vehicle 100 based on an attitude of the trailer 900. The processor 350 may generate and provide a signal for controlling travel of the vehicle 100 to the controller 170 or the vehicle drive unit 150 via the interface 330. The controller 170 or the vehicle drive unit 150 may control the vehicle 100 to travel based on the control signal provided by the processor 350.

Based on a driving condition of trailer 900, the processor 350 may generate and provide a signal for controlling a hitch 910 of the vehicle 100 to switch to a fixed state or an adjustable state.

The hitch 910 is a device that physically connects the vehicle 100 and the trailer 900.

The hitch 910 may be controlled by a control signal generated by the processor 350. For example, the hitch 910 may operate at the fixed state or the adjustable state based on the control signal.

The fixed state indicates a state in which the hitch 910 is fixed such that the vehicle 100 and the trailer 900 are aligned in the same direction, e.g., a length direction, based on movement of the vehicle 100.

The hitch adjustable state indicates a state in which an adjustment of the attitude of the trailer 900 is allowed based on movement of the vehicle 100.

If the vehicle 100 travels straight, the processor 350 may generate and provide a signal for controlling the hitch 910 to switch to the fixed state.

For example, if the vehicle 100 travels straight backward, the processor 350 may generate and provide a signal for controlling the hitch 910, which connects the vehicle 100 and the trailer 900, to switch to the fixed state.

For example, if the vehicle 100 travels at a preset speed or higher, the processor 350 may generate and provide a signal for controlling the hitch 910, which connects the vehicle 100 and the trailer 900, to switch to the fixed state.

For example, if the vehicle 100 travels a preset distance in a straight direction, the processor 350 may generate and provide a control for controlling the hitch 910, which connects the vehicle 100 and the trailer 900, to switch to the fixed state.

If the vehicle 100 is turning at a preset angle or greater, the processor 350 may generate and provide a signal for controlling the hitch 910 to switch to the adjustable state.

For example, if the vehicle 100 receives an input of a steering direction and travels straight, the processor 350 may generate and provide a signal for controlling the hitch 910, which connects the vehicle 100 and the trailer 900, to switch to the adjustable state.

For example, if the vehicle 100 receives an input of a steering direction and travels backwards, the processor 350 may generate and provide a signal for controlling the hitch 910, which connects the vehicle 100 and the trailer 900, to switch to the adjustable state.

For example, if the vehicle 100 receives a left steering input equal to or greater than a preset value, the processor 350 may generate and provide a signal for controlling the hitch 910, which connects the vehicle 100 and the trailer 900, to switch to the adjustable state.

For example, if a right steering input equal to or greater than a preset value is received, the processor 350 may generate and provide a signal for controlling the hitch 910, which connects the vehicle 100 and the trailer 900, to switch to the adjustable state.

Based on an attitude of the trailer 900, the processor 350 may generate and provide at least one control signal among an acceleration control signal, a brake control signal, and a steering control signal to the vehicle drive unit 150 so as to control travel of the trailer 900.

The processor 350 may receive object detection information indicating information about one or more objects outside the vehicle 100 detected by the object detection unit 160. In some implementations, the processor 350 can adjust the object detection information based on an attitude of the trailer 900.

For example, movement of the vehicle 100 being connected with the trailer 900 is different from movement of the vehicle 100 not being connected with the trailer 900. When the trailer 900 is connected with the vehicle 100, the vehicle 100 is followed by the trailer 900. Thus, when the vehicle 100 is connected with the trailer 900, the vehicle 100 is controlled differently comparing to a state in which the vehicle 100 is not connected with the trailer 900.

The processor 350 may perform a control operation based object detection information.

When the trailer 900 is connected with the vehicle 100, the processor 900 may perform a control operation based on the volume and the weight of the trailer 900.

For example, when the vehicle 100 is not connected with the trailer 900, the processor 350 may determine that a following vehicle may be within a distance of "A" meter from the vehicle 100. When the vehicle 100 is connected with the trailer 900, the processor 350 may determine that a value of "A" subtracted by the length of the trailer 900 is a distance between the vehicle 100 and the following vehicle. As a result, the objection detection information can be adjusted.

The processor 350 may detect a distance between the trailer 900 and the detected object based on the adjusted object detection information to determine whether there is a risk of collision between the trailer 900 and the detected object.

The processor 350 may determine a location of the detected object, speed of the detected object, and a distance to the trailer 900 based on information on detection of the object detected by the object detection unit 160.

The risk of collision may indicate a case where a collision occurs due to movement of at least one of the trailer 900 or the detected object when the detected object is located within a preset distance from the trailer 900.

When the detected object is located within the preset distance from the trailer 900, the processor 350 may determine that there is a risk of collision between the trailer 900 and the detected object.

When it is determined that there is a risk of collision between the trailer 900 and the detected object, the processor 350 may generate and provide a signal for controlling the vehicle 100 so that the trailer 900 moves a preset distance away from the detected object.

The processor 350 may determine a distance between the object and the trailer 900 and speed of the object based on object detection information which is adjusted based on an attitude of the trailer 900.

For example, if an object expected to collide with the trailer 900 approaches the rear of the trailer 900, the processor 350 may generate an acceleration control signal to avoid the object.

For example, if an object expected to collide with the trailer 900 approaches the side of the trailer 900, the processor 350 may generate an acceleration control signal, a brake control signal, and a steering control signal to avoid the object.

The processor 350 may generate and provide the acceleration control signal and the steering control signal to the vehicle drive unit 150.

The processor 350 may determine the current lane of travel of the trailer 900 based on an image received from the camera unit 310.

The processor 350 may detect a lane of travel of the vehicle 100 from an image received from the camera unit 310.

The processor 350 may detect a lane of travel of the trailer 900 from images received from a plurality of cameras 910 via the interface 330.

Based on an attitude of the trailer 900, the processor 350 may determine whether the trailer 900 is out of the lane of travel.

The processor 350 may generate and provide a signal for controlling the vehicle 100 so that the trailer maintains the lane of travel.

For example, when it is determined that the trailer 900 is not out of the lane of travel, the processor 350 may generate and provide a control signal so that the trailer 900 maintains the lane of travel. The processor 350 may generate and provide the acceleration control signal and the steering control signal to the vehicle drive unit 150.

For a parking operation, the processor 350 may generate a parking path based on an attitude of the trailer 900.

The processor 350 may define a parking space based on an image including the vehicle 100 and the trailer 900.

The processor 350 may determine a parking space based on the overall length of the vehicle 100 and the trailer 900.

A parking space 1710 is a space in which the vehicle 100 is to be parked. The parking space 1710 is a space in which the vehicle 100 is able to move without colliding with an object detected during a parking operation. The processor 350 may determine the object's type, size, location, speed, and distance to the trailer 900.

The processor 350 may determine the parking space 1710 based on a type and an attitude of the trailer 900. The processor 350 may determine the parking space 1710 based on an object detected by the object detection unit 160.

Based on the parking space, the processor 350 may generate a parking path of the vehicle 100 connected with the trailer 900.

The parking path is a path required for the trailer 900 to perform a parking operation.

The processor 350 may determine a steering angle, forward movement, and backward movement of the trailer 900, which are required to control parking the trailer 900. The processor 350 may generate a parking path of the vehicle 100 based on change in the steering angle, forward movement, backward movement, and a speed for the vehicle 100 so as to park the trailer 900.

The processor 350 may generate a signal for controlling the vehicle 100 to park the trailer 900 along the parking path.

To park the trailer 900 along the parking path, the processor 350 may generate and provide a signal for controlling at least one control signal among the power source drive unit 151, the steering drive unit 152, and the brake drive unit 153 included in the vehicle drive unit 150.

The processor 350 may generate and provide the generated control signal to the vehicle drive unit 150 so as to control the vehicle 100 to park the trailer 900 along the parking path.

For example, in order to park the trailer 900 backwards to the right, the processor 350 may generate and provide a steering control signal for controlling the steering of the vehicle 100 to the left so that the rear of the vehicle 100 is directed toward to the left. The processor 350 may generate and provide an acceleration control signal to control the vehicle 100 to travel backwards.

For example, in the case of parking the trailer 900 backwards to the left, the processor 350 may generate and provide a steering control signal for controlling the steering of the vehicle 100 to the right so that the rear of the vehicle 100 is directed toward the right. The processor 350 may generate and provide an acceleration control signal to control the vehicle 100 to travel backwards.

Based on an attitude of the trailer 900, the processor 350 may generate and provide at least one control signal between a trailer braking control signal and a steering control signal to control wheels of the trailer 900.

The processor 350 may determine whether there is a risk of collision between the trailer 900 and a detected object.

If it is determined that there is a risk of collision between the trailer 900 and the detected object, the processor 350 may generate and provide a signal for controlling the wheels of the trailer 900 so that the trailer 900 moves a preset distance away from the detected object.

If the detected object approaches the trailer 900 within the preset distance, the processor 350 may determine that there is a risk of collision between the trailer 900 and the detected object.

The risk of collision may indicate a case where collision occurs due to movement of at least one of the trailer 900 and the detected object when the detected object is located within the preset distance from the trailer 900.

For example, if an object expected to collide with the trailer 900 approaches the right side of the trailer 900, the processor 350 may generate and provide a steering control signal for controlling the wheels of the trailer 900 so that the trailer 900 is directed toward the left.

For example, if an object expected to collide with the trailer 900 approaches the left side of the trailer 900, the processor 350 may generate and provide a steering control signal for controlling the wheels of the trailer 900 so that the trailer 900 is directed toward the right.

The processor 350 may generate and provide a steering control signal to the trailer 900 via the interface 330.

The processor 350 may determine a lane of travel of the trail 900 based on an image provided from the vehicle 100 and the trailer 900, and generate and provide a signal for controlling the wheels of the trailer 900 so that the trailer 900 maintains the lane of travel.

The processor 350 may generate and provide a signal for controlling the wheels of the trailer 900 so that the trailer 900 maintains the lane of travel.

For example, when it is determined that the trailer 900 is out of its lane of travel, the processor 250 may provide a control signal so that the trailer 900 maintains the lane of travel. The processor 350 may generate and provide a steering control signal to the trailer 900 so that the direction of travel of the trailer 900 is in parallel with the lane of travel.

The processor 350 may generate and provide a signal for controlling the wheels of the trailer 900 so that the trailer 900 travels along a travel path as the same as that of the vehicle 100.

The processor 350 may generate a travel path of the trailer 900.

A travel path is a path required for a vehicle to travel on the roads.

The processor 350 may generate at least one control signal between a steering control signal and a braking control signal so that the trailer 900 travels along a path as the same as a travel path of the vehicle 100.

For example, when the vehicle 100 is cornering to the right, the processor 350 may generate and provide a steering control signal so that the wheels of the trailer 900 are directed toward the right.

For example, when the vehicle 100 is cornering to the left, the processor 350 may generate and provide a steering control signal so that the wheels of the trailer are toward the left.

The processor 350 may generate and provide a steering control signal corresponding to the travel path of the vehicle 100 to the trailer 900 via the interface 330.

The power supply unit 360 may, under control of the processor 350, provide power necessary for operation of each component. In particular, the power supply unit 360 may be supplied with power from a battery inside the vehicle.

The output unit 370 may include a display unit 371 and a sound output unit 373.

The display unit 371 may display various types of information processed by the processor 350. The display unit 371 may display an image related to operation of the apparatus 300.

The display unit 371 may display an around-view image generated by the processor 350. In some implementations, the display unit 371 may provide various user interfaces when displaying the around-view image, and may include a touch sensor for enabling a touch input to a provided user interface.

In some implementations, the display unit 371 may be implemented to display an image on a room mirror, a side mirror, or a side window glass.

For example, the display unit 371 may be disposed in the room mirror or the side mirror. In this case, the display unit 371 may serve as a mirror normally and display an image upon occurrence of a specific event.

For example, the display unit 371 may be in the form of a transparent display placed close to a side window glass. In another example, the display unit 371 may include a projection module which may project an image onto the side window glass.

For example, the display 371 may be in the form of a transparent display placed close to a front wind shield. In another example, the display unit 371 may include a projection module which may project an image onto the front wind shield.

The sound output unit 373 may output sound to the outside based on an audio signal processed by the processor 350. To this end, the sound output unit 373 may include at least one speaker.

Figure 5:
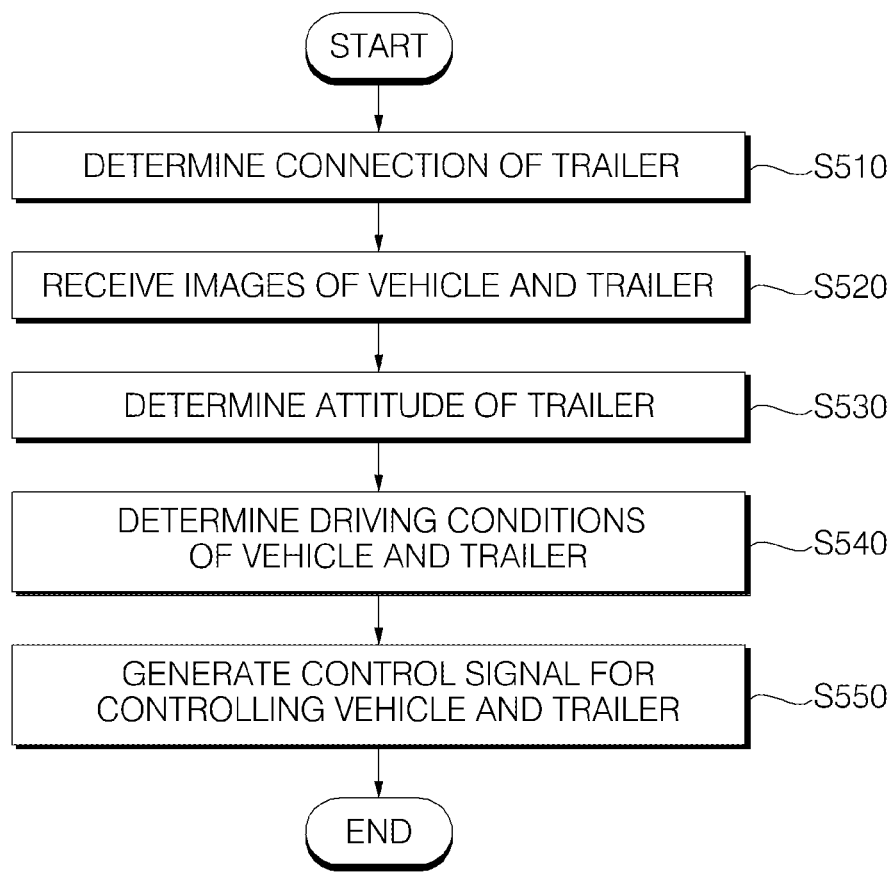
FIG. 5 is a flowchart illustrating an example method for operating an apparatus for providing an around view image of a vehicle.

FIG. 5 illustrates an example method for operating an apparatus for providing an around view image of a vehicle.

Referring to FIG. 5, the processor 350 may determine connection of the trailer in S510.

When the vehicle 100 and the trailer 900 are connected with each other by the hitch 910, the processor 350 may receive, from the trailer 900, data which include at least one of trailer image information, trailer direction information, trailer location information (GPS information), trailer angle information, trailer speed information, trailer acceleration information, trailer tilt information, and trailer lamp information. When the data is received from the trailer 900, the processor 350 may determine that the vehicle 100 and the trailer 900 are connected with each other.

In some implementations, when the trailer 900 is detected from a rear view image of the vehicle 100 provided from the camera unit 310 and data is transmitted to the trailer 900, the processor 350 may determine that the trailer 900 and the vehicle 100 are connected with each other.

The processor 350 may receive images of the vehicle 100 and the trailer 900 from the camera unit 310 in S520.

The processor 350 may receive images of the surroundings of the trailer 900 via the interface 330 from a plurality of cameras 910 attached to the trailer 900.

The processor 350 may detect the trailer 900 connected with the vehicle 100 from images which are received from the vehicle 100 and the trailer 900.

Then, the processor 350 may determine an attitude of the trailer 900 in S530.

The attitude of the trailer 900 is a position of the trailer 900 with respect to the rear of the vehicle 100 according to a distance between the vehicle 100 and the trailer 900 and an angle between the vehicle 100 and the trailer 900.

The processor 350 may match markers with a trailer 100 detected from an image provided from the camera unit 310. The processor 350 may determine an attitude of the trailer 900 based on an angle which is formed between the trailer 900 and the markers.

The processor 350 may determine an attitude of the trailer 900 by receiving gyro sensing information from the trailer 900. The processor 350 may determine the attitude of the trailer 900 based on location information and direction information of the trailer 900.

The processor 350 may determine driving conditions of the vehicle 100 and the trailer 900 in S540.

The processor 350 may generate and provide a signal for controlling the vehicle 100 and the trailer 900 based on a driving condition and an attitude of the trailer 900 in S550.

Based on the attitude of the trailer 900, the processor 350 may generate and provide a signal for controlling a hitch which connects the vehicle 100 and the trailer 900. Based on the driving condition of the trailer 900, the processor 350 may generate and provide a signal for controlling the vehicle drive unit 150. Based on the driving condition of the trailer 900, the processor 350 may generate and provide a signal for controlling the trailer 900.

Figure 6:
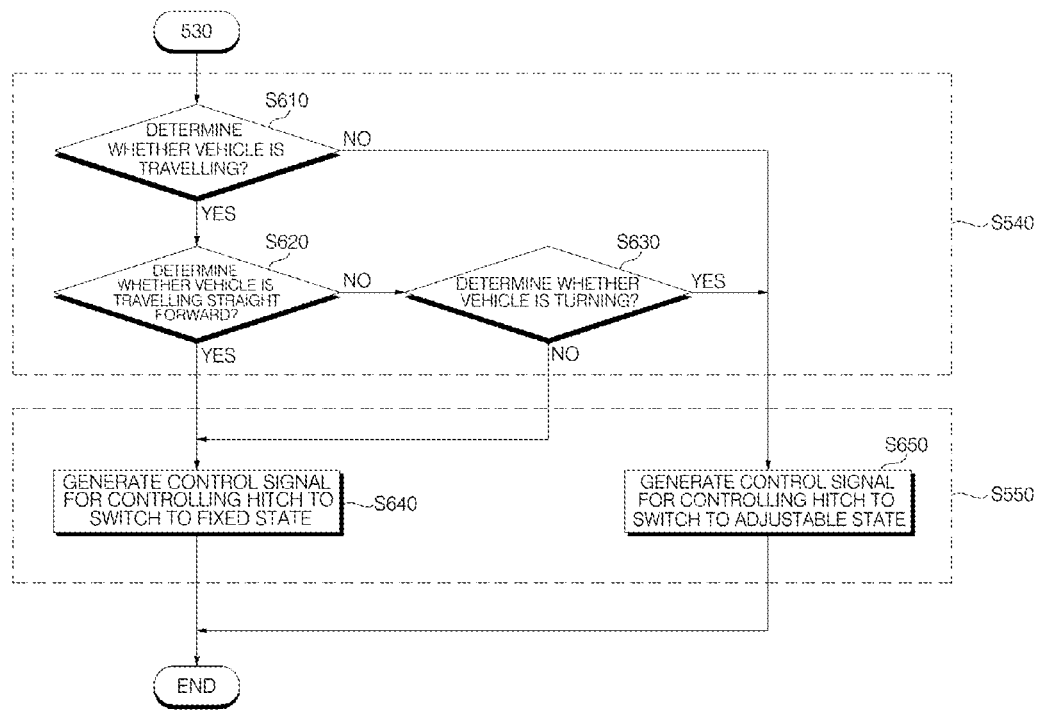
FIG. 6 is a flowchart illustrating an example method for controlling a hitch that couples a trailer to a vehicle.

FIG. 6 illustrates an example method for controlling a hitch that couples a trailer to a vehicle.

Referring to FIG. 6, the processor 350 may determine whether the vehicle 100 is travelling in S610.

If the vehicle 100 is not travelling, the processor 350 may generate a signal for controlling a hitch to switch to an adjustable state in S650.

The adjustable state is a state in which a hitch connecting the vehicle 100 and the trailer 900 is changed by steering of the vehicle 100 and thus manipulating a steering angle of the trailer 900 is allowed.

If the vehicle 100 is travelling, the processor 350 may determine whether the trailer 900 is travelling straight in S620.

When the vehicle 100 is travelling straight, the processor 350 may generate a signal for controlling the hitch to switch to a fixed state in S640.

The fixed state is a state in which the hitch connecting the vehicle 100 and the trailer 900 is changed by steering of the vehicle and thus manipulating a steering angle of the trailer is not allowed.

If the vehicle 100 is not travelling straight, the processor 350 may determine whether the trailer 900 is turning in S630.

If the vehicle 100 is not turning, the processor 350 may generate a signal for controlling the hitch to switch to the fixed state in S640.

If the vehicle 100 is turning, the processor 350 may generate a signal for controlling the hitch to switch to the adjustable state in S650.

Figure 7:
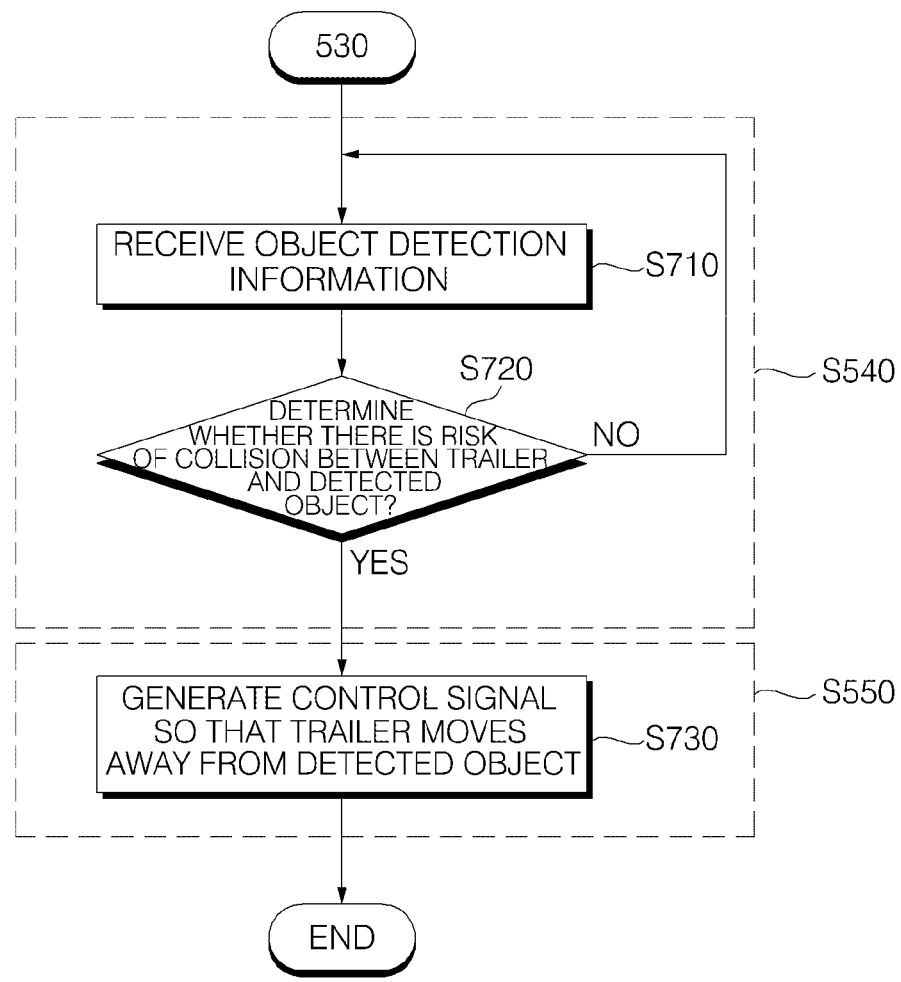
FIG. 7 is a flowchart illustrating an example method for controlling a trailer to avoid a collision based on an attitude of the trailer.

FIG. 7 illustrates an example method for controlling a trailer to avoid a collision based on an attitude of the trailer.

Referring to FIG. 7, the processor 350 may receive object detection information from the object detection unit 160 in S710.

Then, based on the object detection information and an attitude of the trailer, the processor 350 may determine whether there is a risk of collision between the trailer 900 and a detected object in S720.

The risk of collision may indicate a case where collision occurs due to movement of at least one of the trailer 900 and the detected object when the detected object is located within a preset distance from the trailer 900.

If it is determined that there is a risk of collision between the trailer 900 and the object, the processor 350 may receive object detection information from the object detection unit 160 in S710.

If it is determined that there is a risk of collision between the trailer 900 and the object, the processor 350 may generate and provide a control signal so that the trailer 900 moves a preset distance away from the object in S730.

The processor 350 may generate and provide at least one control signal among an acceleration control signal, a brake control signal, and a steering control signal to the vehicle drive unit 150.

The processor 350 may generate and provide at least one control signal between the brake control signal and the steering control signal to the trailer via the interface 330.

Figure 8:
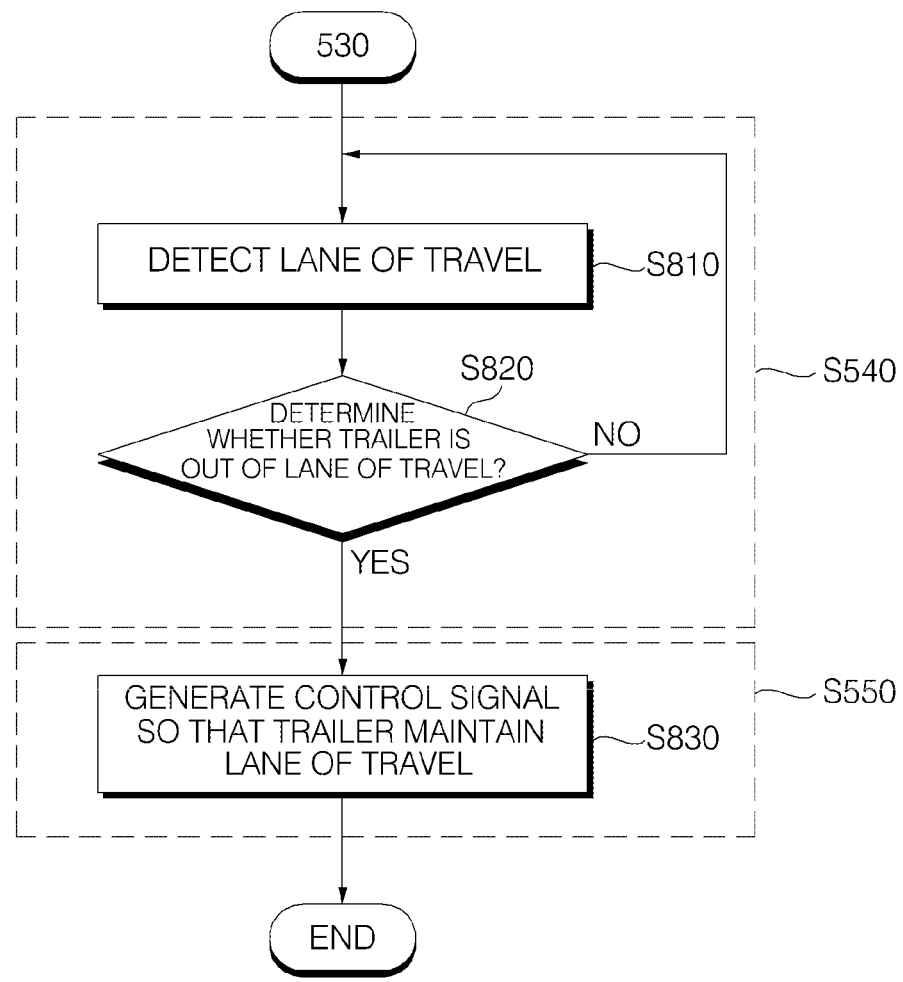
FIG. 8 is a flowchart illustrating an example method for maintaining a traveling lane of a vehicle based on an attitude of a trailer.

FIG. 8 illustrates an example method for maintaining a traveling lane of a vehicle based on an attitude of a trailer.

Referring to FIG. 8, the processor 350 may detect a lane of travel of the trailer 900 from an image received from the camera unit 310 in S810.

Then, based on the lane of travel and an attitude of the trailer 900, the processor 350 may determine whether the trailer 900 is out of the lane of travel in S820.

If it is determined that the trailer 900 is not out of the lane of travel, the processor 350 may detect a lane of travel again in S810.

Then, if it is determined that the trailer 900 is out of the lane of travel, the processor 350 may generate and provide a control signal so that the trailer 900 maintains the lane of travel in S830.

The processor 350 may generate and provide at least one control signal among an acceleration control signal, a brake control signal, a steering control signal to the vehicle drive unit 150.

The processor 350 may generate and provide at least one control signal between the brake control signal and the steering control signal to the trailer 900 via the interface 300.

Figure 9:
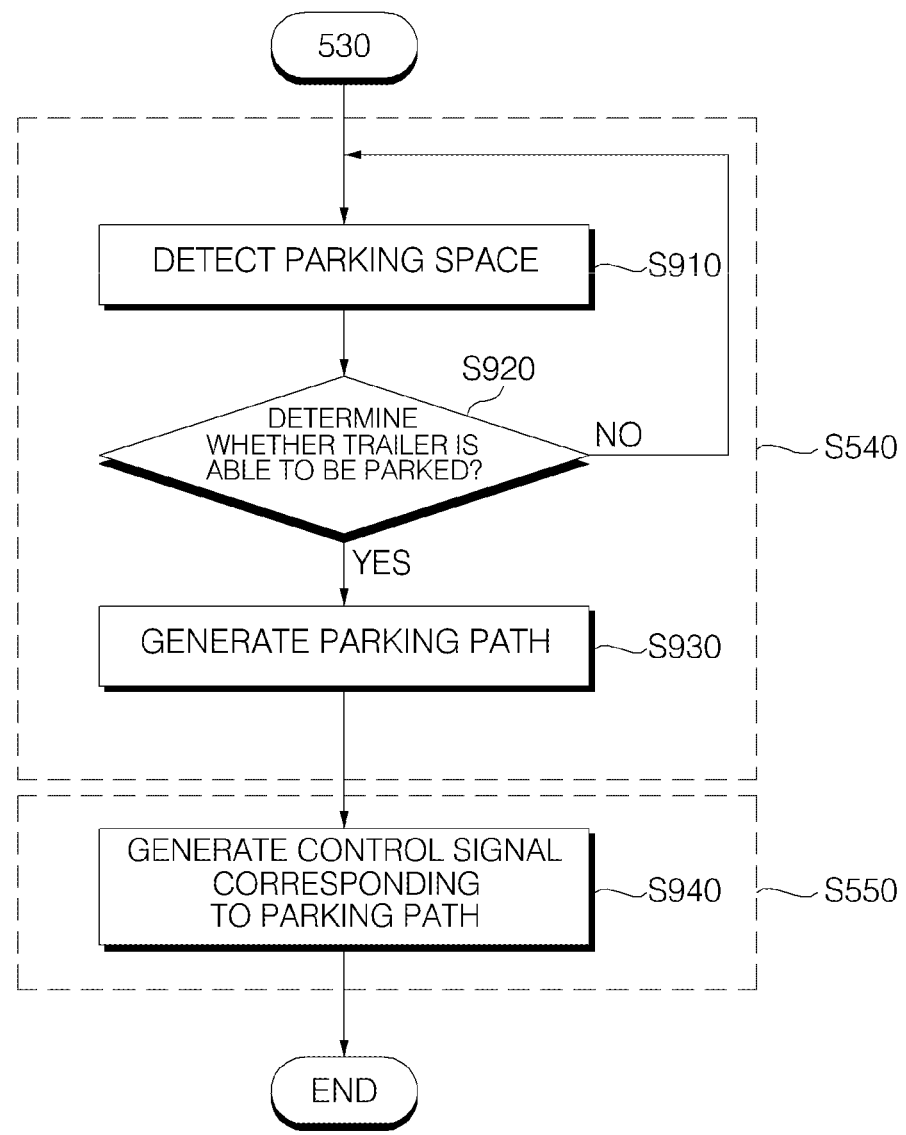
FIG. 9 is a flowchart illustrating an example method for parking a vehicle and a trailer based on an attitude of the trailer.

FIG. 9 illustrates an example method for parking a vehicle and a trailer based on an attitude of the trailer.

Referring to FIG. 9, the processor 350 may detect a parking space from an image received from the camera unit 310 in S910.

Then, based on a shape of the trailer 900, the processor 350 may determine whether the trailer 900 is able to be parked in S920.

If the trailer 900 is not able to be parked, the processor 350 may detect a parking space in S910.

If the trailer is able to be parked, the processor 350 may generate a parking path in S930.

Then, the processor 350 may generate and provide a control signal to park the trailer 900 in the parking space along the parking path in S940.

The processor 350 may generate and provide at least one control signal among an acceleration control signal, a brake control signal, and a steering control signal to the vehicle drive unit 150.

The processor 350 may generate and provide at least one control signal between the brake control signal and the steering control signal to the trailer 900 via the interface 330.

Figure 10A:
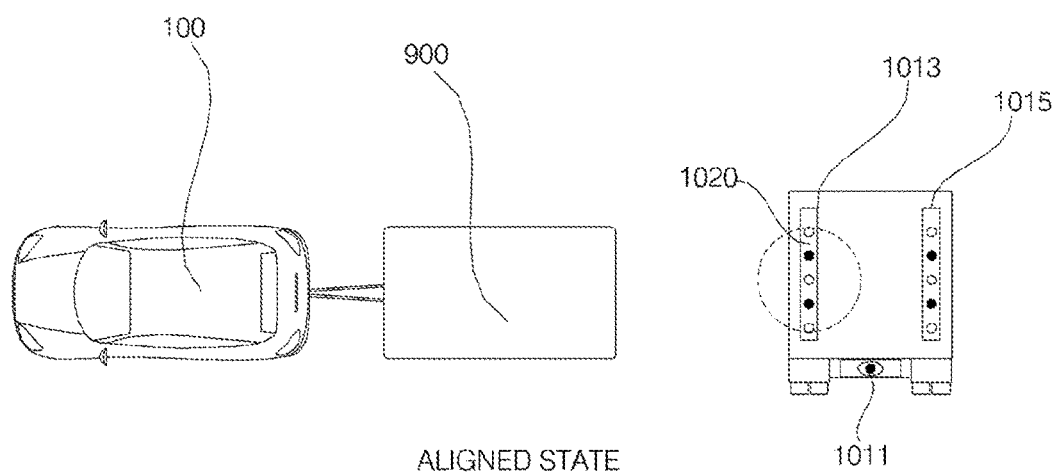
FIGS. 10A and 10B are diagrams illustrating an example vehicle and an example trailer where an example apparatus determines an attitude of the trailer using markers.
Figure 10B:
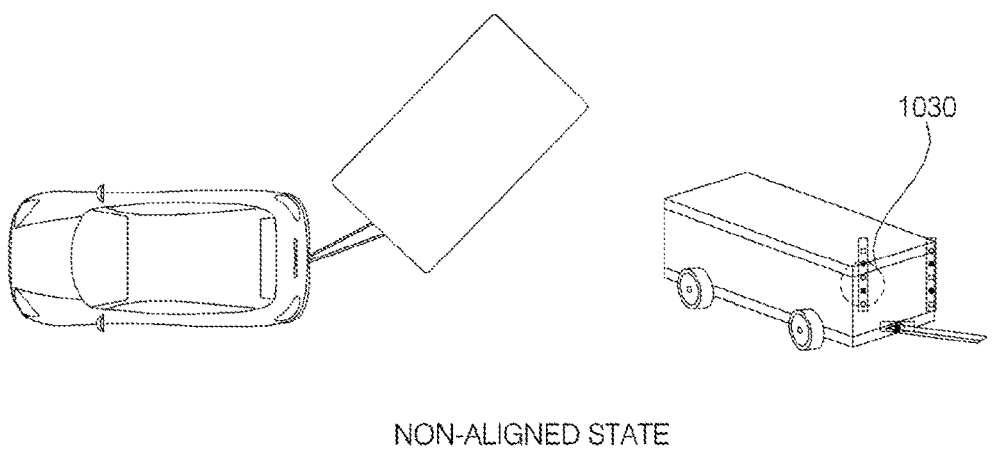

FIGS. 10A and 10B illustrate an example vehicle and an example trailer where an example apparatus determines an attitude of the trailer using markers.

Referring to FIGS. 10A and 10B, the processor 350 may receive a rear view image of the vehicle 100 from the camera unit 310, and detect a trailer 900 from the rear view image of the vehicle 100.

The processor 350 may be provided with preset markers stored in the memory 340. The markers are data that is generated based on an attitude of the trailer 900 in a state in which the trailer 900 and the vehicle 100 are aligned in an overall-length direction of the vehicle 100. The processor 350 may match the markers with the rear view image of the vehicle 100, the image from which the trailer 900 has been detected.

For example, the processor 350 may match a front marker 1011 with the lower edge of the front side of the detected trailer. The processor 350 may match the left marker 1013 with the left edge of the front side of the detected trailer. The processor 350 may match the right marker 1015 with the right edge of the front side of the detected trailer.

The processor 350 may determine an attitude of the trailer 900 based on an angle between the trailer 900 and the markers For example, the processor 350 may match the front marker 1011 in parallel with a detected lower edge of the front side of the trailer 900, and then determine an attitude of the trailer 900 based on an angle between the left marker 1013 and the left edge of the front side of the trailer 900 and an angle between the right marker 1015 and the right edge of the front side of the trailer 900.

For example, the processor 350 may match the left marker 1013 in parallel with a detected left edge of the front side of the trailer 900, and then determine an attitude of the trailer 900 based on an angle between the front marker 1013 and the lower edge of the front side of the trailer 900 and an angle between the right marker 1015 and the right edge of the front side of the trailer 900.

For example, the processor 350 may match the right marker 1015 in parallel with a detected right edge of the front side of the trailer 900, and then determine an attitude of the trailer 900 based on an angle between the front marker 1011 and the lower edge of the front side of the trailer 900 and an angle between the left marker 1013 and the left edge of the front side of the trailer 900.

FIG. 10A shows a case where a trailer is in an aligned state.

The processor 350 may match the front marker 1011 in parallel with the detected lower edge of the front side of the trailer 900, and then determine that the trailer 900 is in an aligned state, if the angle between the left marker 1013 and the left edge of the front side of the trailer 900 and the angle between the right marker 1015 and the right edge of the front side of the trailer 900 fall within a preset range.

For example, the processor 350 may match the left marker 1013 in parallel with the detected left edge of the front side of the trailer 900, and then determine that the trailer 900 is in an aligned state, if the angle between the front marker 1013 and the lower edge of the front side of the trailer 900 and the angle between the right marker 1015 and the right edge of the front side of the trailer 900 fall within a preset range.

For example, the processor 350 may match the right marker 1015 in parallel with the detected right edge of the front side of the trailer 900, and then determine that the trailer is in an aligned state, if an angle between the front marker 1011 and the lower edge of the front side of the trailer 900 and an angle between the left marker 1013 and the left ledge of the front side of the trailer 900 fall within a preset range.

FIG. 10B illustrates a case where a trailer is in a non-aligned state.

When the overall-length direction of the trailer 900 is on the left side of the overall-length direction of the vehicle 100, the processor 350 may match the left marker 1013 with a detected left edge of the front side of the trailer 900. Then, if the front marker 1011 and the lower edge of the front side of the trailer 900 and the right marker 1015 and the right edge of the front side of the trailer 900 fall within a preset range, the processor 350 may determine that the overall length direction of the trailer 900 is toward the left in the overall length direction of the vehicle 100.

In addition, when the overall length direction of the trailer 900 is on the left side of the overall length direction of the vehicle 100, the processor 350 may match the right marker 1015 in parallel with the right edge of the front side of the trailer 900. Then, if an angle between the front marker 1011 and the lower edge of the front side of the trailer 900 and an angle between the left marker 1015 and the left edge of the front side of the trailer 900 fall within a preset range, the processor 350 may determine that the overall length direction of the trailer 900 is toward the right in the overall length direction of the vehicle 100.

Figure 11A:
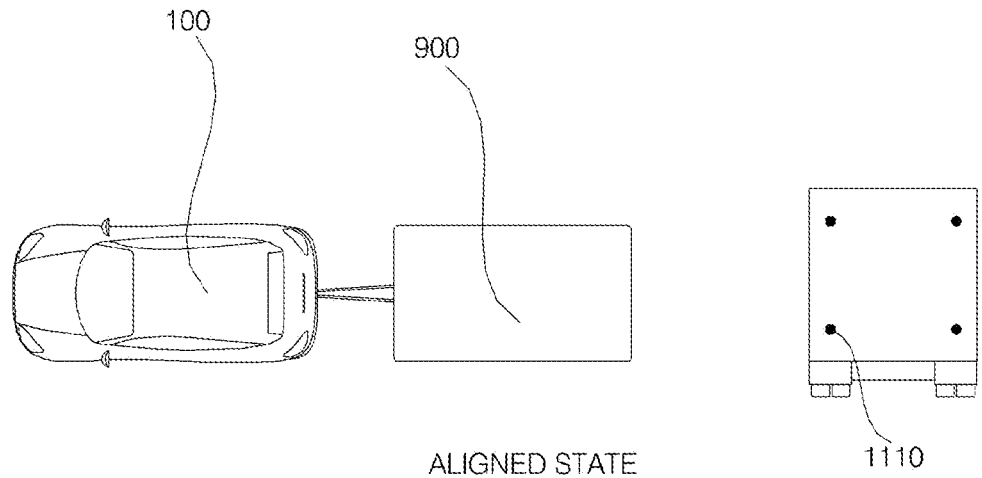
FIGS. 11A and 11B are diagrams illustrating an example vehicle and an example trailer where an example apparatus determines an attitude of the trailer using a gyro sensor.
Figure 11B:
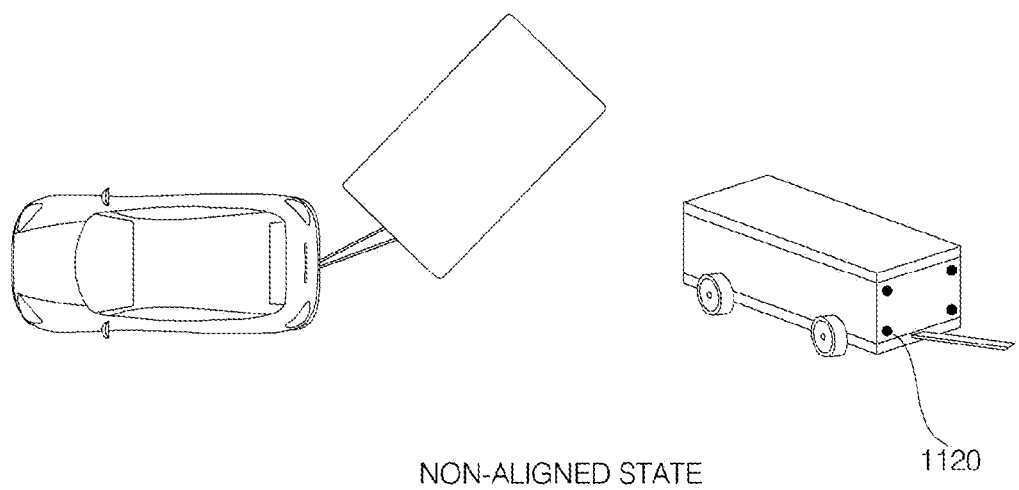

FIGS. 11A and 11B illustrate an example vehicle and an example trailer where an example apparatus determines an attitude of the trailer using a gyro sensor.

Referring to FIGS. 11A and 11B, the processor 350 may receive gyro sensing information from the trailer 900 via the interface 330. The gyro sensing information may include location information and direction information of the trailer 900. The processor 350 may receive a preset gyro sensor reference value from the memory 340. The processor 350 may determine an attitude of the trailer 900 based on the gyro sensor reference value and the current trailer gyro sensing information.

FIG. 11A shows a case where a trailer is in an aligned state.

The processor 350 may receive gyro sensing information from the trailer 900 via the interface 330. The processor 350 may receive a preset gyro sensing value from the memory 340.

The processor 350 may determine an attitude of the trailer 900 based on location information and direction information of the trailer 900, the information which are obtained based on a gyro sensing reference value 1110 and the gyro sensing information.

If the reference value and the gyro sensing information have the same value, the processor 350 may determine that the trailer 900 is in an aligned state.

FIG. 11B shows a case in which a trailer is in a non-aligned state.

The processor 350 may receive gyro sensing information 1120 from the trailer 900 via the interface 330. The processor 350 may receive a preset gyro sensing reference value 1110 from the memory 340.

If the gyro sensing reference value 1110 and the gyro sensing information 1120 have different values, the processor 350 may determine that the trailer 900 is in a non-aligned state.

If the gyro sensing reference value 1110 and the gyro sensing information 1120 have different values, the processor 350 may determine an overall-length direction of the trailer 900 based on the gyro sensing reference value 1110 and the second gyro sensing information 1120.

Figure 12A:
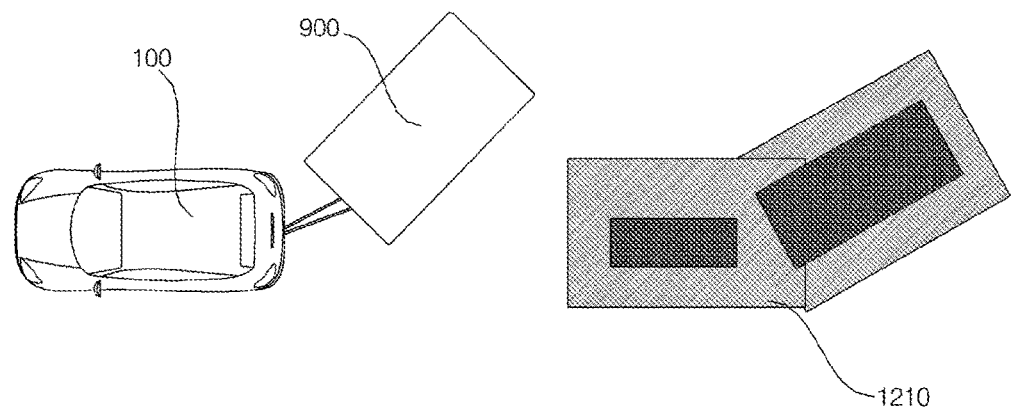
FIGS. 12A and 12B are diagrams illustrating an example vehicle and an example trailer where an example apparatus provides an LUT based on an attitude of the trailer.
Figure 12B:
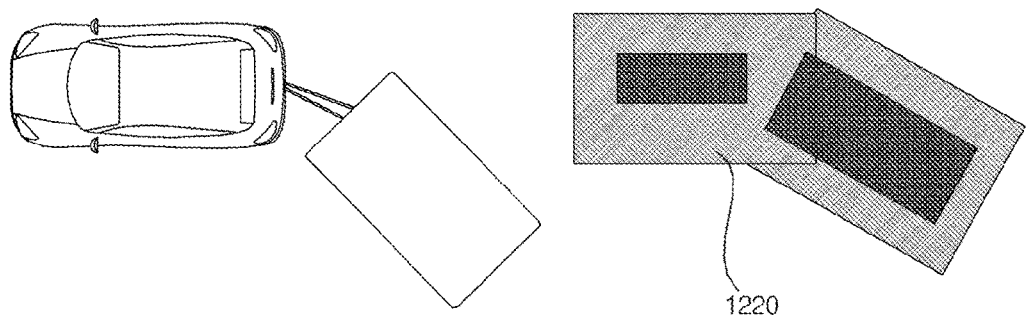

FIGS. 12A and 12B illustrate an example vehicle and an example trailer where an example apparatus provides an LUT based on an attitude of the trailer.

Referring to FIGS. 12A and 12B, the processor 350 may receive, from the memory 340, a plurality of LUTs that are generated in advance corresponding to attitudes of the trailer 900.

If an attitude of the trailer 900 is changed during travel of the vehicle 100, the processor 350 may generate an around view image of the vehicle 100 and the trailer 900 based on an LUT corresponding to the current attitude of the trailer 900.

If an attitude of the trailer 900 is changed, the processor 350 may select an LUT corresponding to the current attitude of the trailer 900 from among a plurality of LUTs stored in the memory 340. The processor 350 may generate and provide an around view image corresponding to the current attitude of the trailer 900 based on the selected lookup table.

FIG. 12A shows a case where the trailer 900 is rotated to the right with respect to the front of the vehicle 100. The processor 350 may receive, from the memory 340, an LUT corresponding to the attitude of the trailer 900 rotated to the right. Based on the LUT, the processor 350 may generate and provide an around view image including the trailer 900 on the left side.

FIG. 12B shows a case where the trailer 900 is rotated to the left with respect to the front of the vehicle 100. The processor 350 may receive, from the memory 340, an LUT corresponding the attitude of the trailer 900 rotated to the left. Based on the lookup table, the processor 350 may generate and provide an around view image including the trailer 900 on the left side.

Figure 13:
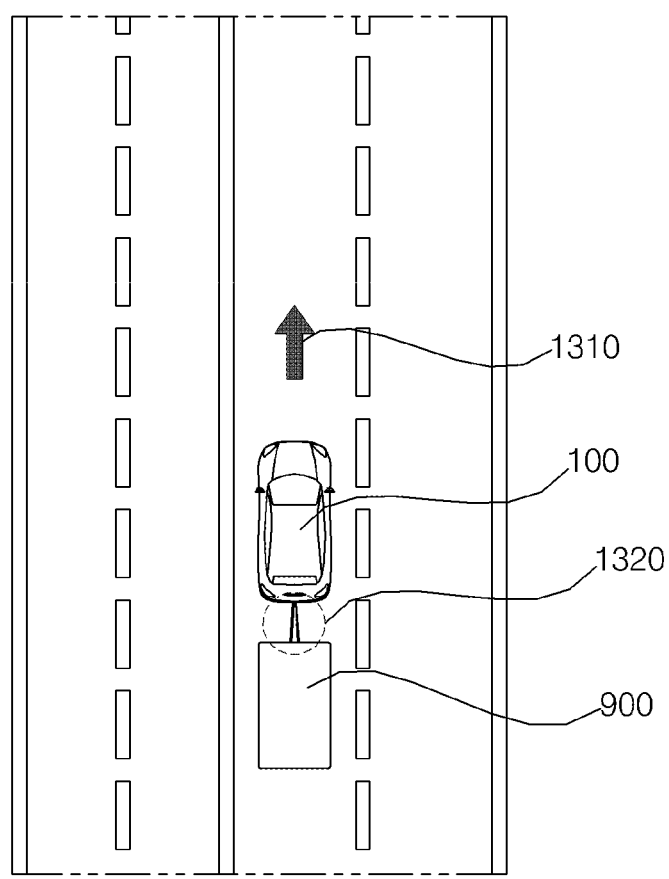
FIG. 13 is a diagram illustrating an example vehicle and an example trailer where an example apparatus controls a hitch.

FIG. 13 illustrates an example vehicle and an example trailer where an example apparatus controls a hitch.

Referring to FIG. 13, if the vehicle 100 travels straight, the processor 350 may generate and provide a signal for controlling the hitch 910, which connects the vehicle 100 and the trailer 900, to switch to a fixed state.

For example, if the vehicle 100 travels straight backward, the processor 350 may generate and provide a signal for controlling the hitch 910, which connects the vehicle 100 and the trailer 900, to switch to a fixed state.

For example, if the vehicle 100 travels at a preset speed or higher, the processor 350 may generate and provide a signal for controlling the hitch 910, which connects the vehicle 100 and the trailer 900, to switch to a fixed state.

For example, if the vehicle 100 travels a preset distance in a straight direction, the processor 350 may generate and provide a signal for controlling the hitch 910, which connects the vehicle 100 and the trailer 900, to switch to a fixed state.

Figure 14:
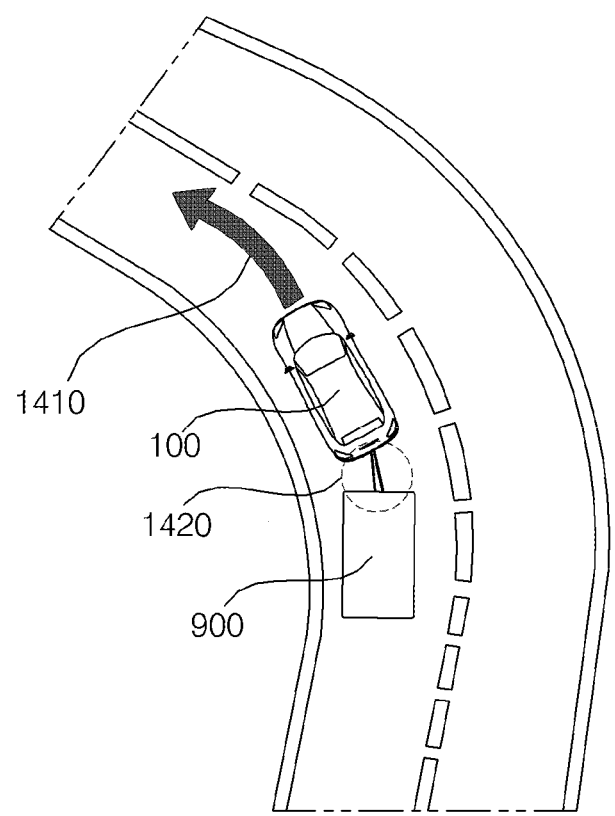
FIG. 14 is a diagram illustrating an example vehicle and an example trailer where an example apparatus controls a hitch.

FIG. 14 illustrates an example vehicle and an example trailer where an example apparatus controls a hitch.

If a steering direction of the vehicle 100 is input and the vehicle 100 travels forward, the processor 350 may generate and provide a signal for controlling the hitch 910, which connects the vehicle 100 and the trailer 900, to switch to an adjustable state.

For example, if the vehicle 100 receives an input of a steering direction and travels backwards, the processor 350 may generate and provide a signal for controlling the hitch 910, which connects the vehicle 100 and the trailer 900, to switch to an adjustable state.

For example, if a left steering input is received and an angle of the steering input is greater than a preset value, the processor 350 may generate and provide a signal for controlling the hitch 910, which connects the vehicle 100 and the trailer 900, to switch to an adjustable state.

For example, if a right steering input is received and an angle of the steering input is greater than a preset value, the processor 350 may generate and provide a signal for controlling the hitch 910, which connects the vehicle 100 and the trailer 900, to switch to an adjustable state.

Figure 15A:
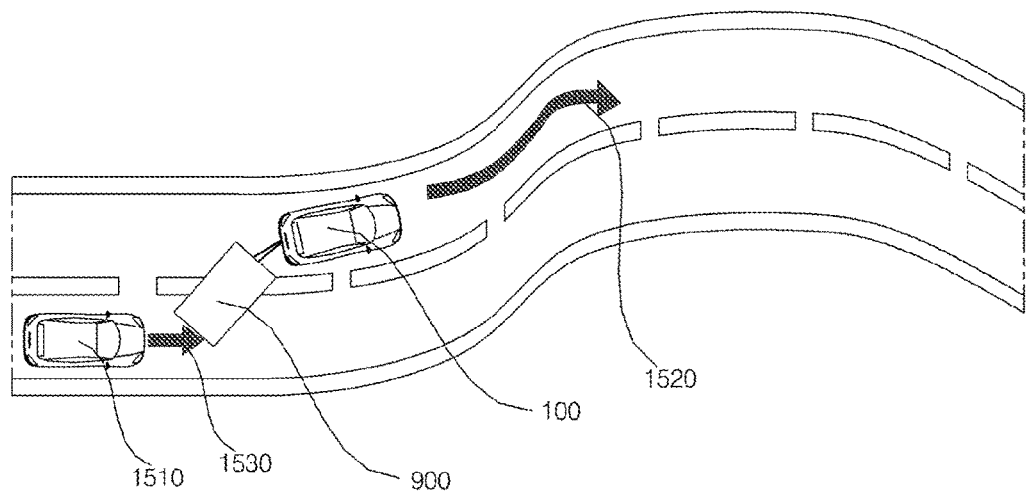
FIGS. 15A and 15B are diagrams illustrating an example vehicle and an example trailer where an example apparatus controls the vehicle and the trailer to avoid a collision between the trailer and an external object.
Figure 15B:
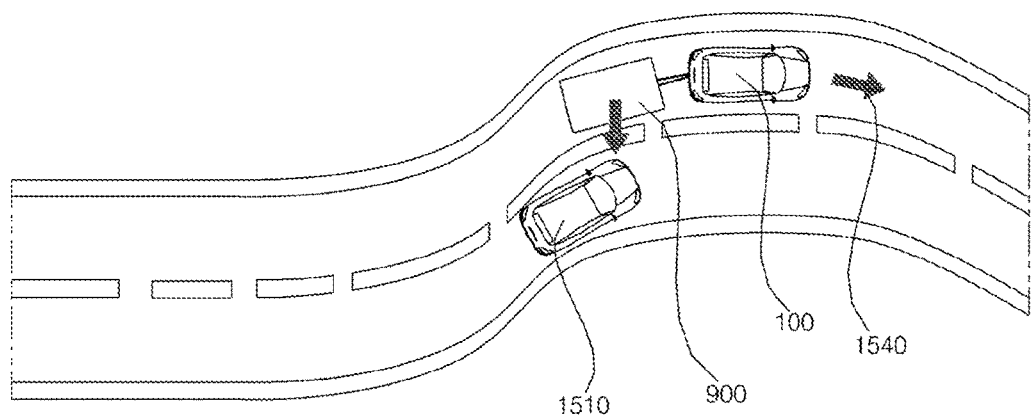

FIGS. 15A and 15B illustrate an example vehicle and an example trailer where an example apparatus controls the vehicle and the trailer to avoid a collision between the trailer and an external object.

Referring to FIGS. 15A and 15B, the trailer 900 or an object may approach during travel of the vehicle 100.

The processor 350 may be provided from the object detection unit 160 with object detection information. The processor 350 may determine a location a detected object, a speed thereof, and a distance thereof from the trailer 900 based on the object detection information.

Based on the object detection information, the processor 350 may determine whether there is a risk of collision between the trailer 900 and a detected object 1510.

If the trailer 900 is located within a preset distance from the detected object, the processor 350 may determine that there is a risk of collision between the trailer 900 and the detected object.

The processor 350 may determine a location at which the trailer 900 is able to avoid the collision between the trailer 900 and the object. The processor 350 may generate a travel path 1520 required for the trailer 900 to move to the location. The processor 350 may generate and provide an acceleration control signal and a steering control signal to travel along the travel path 1520. The processor 350 may generate and provide the acceleration control signal and the steering control signal to the vehicle drive unit 150.

FIG. 15A shows a case where an object approaches the trailer 900 which is travelling.

In FIG. 15A, the processor 350 may receive, from the object detection unit 160, information on an object 1510 which approaches the trailer 900. The processor 350 may determine an attitude of the trailer 900. The processor 350 may determine a travel path 1530 of the object 1510 based on the attitude of the trailer 900 so as to determine whether there is a risk of collision between the trailer 900 and the object 1510.

If it is determined that there is a risk of collision between the trailer 900 and the object 1510, the processor 350 may generate and provide a control signal to avoid the object 1510.

For example, if the object 1510 approaches the rear of the trailer 900, the processor 350 may generate and provide an acceleration signal to the vehicle 100 so that the trailer 900 travels forward. If there is a sufficient empty space in front of the vehicle 100, the processor 350 may generate and provide an acceleration control signal so that the trailer 900 travels forward. The processor 350 may generate and provide a vehicle control signal to control the vehicle 100 to travel forward so that the trailer 900 moves a preset distance away from the object 1510.

If an object (now shown) approaches the trailer 900 from the left side, the processor 350 may determine, based on information received from the sensing unit 125, whether there is a sufficient empty space in front of or on the right side of the vehicle 100. If it is determined that there is a sufficient empty space in front of and on the right side of the vehicle 100, the processor 350 may generate and provide a right steering control signal and an acceleration control signal to the vehicle 100 to control the trailer 900 to travel toward the right. The processor 350 may generate and provide a vehicle control signal to control the vehicle 100 to travel in a right forward direction so that the trailer 900 moves a preset distance away from the object.

If the object 1510 approaches the trailer 900 from the right side, the processor 350 may determine, based on information received from the sensing unit 135, whether there is a sufficient empty space in front or on the left side of the vehicle 100. The processor 350 may generate and provide a left steering control signal and an acceleration control signal to the vehicle 100 to control the trailer 900 to travel toward the left. The processor 350 may generate and provide a vehicle control signal to control the vehicle 100 to travel in a left forward direction so that the trailer 900 moves a preset distance away from the object 1510.

FIG. 15B shows a case where the trailer 900, which is travelling, approaches an object.

In FIG. 15B, the processor 350 may receive, from the object detection unit 160, information on an object 1510 which the trailer 900 approaches. The processor 350 may determine a travel path 1530 of the trailer 900 based on an attitude of the trailer 900 so as to determine whether there is a risk of collision between the trailer 900 and the object 1510.

If it is determined that there is a risk of collision between the trailer 900 and the object 1510, the processor 350 may generate and provide a vehicle control signal to avoid the collision.

If the trailer 900 approaches an object 1510 located at the rear of the trailer 900, the processor 350 may generate and provide a brake control signal to the vehicle 100 so that the trailer 900 moves a preset distance away from the object 1510.

If the trailer 900 becomes an object located on the left side of the trailer 900, the processor 350 may determine, based on information received from the sensing unit 125, whether there is a sufficient empty space in the front or on the right side of the vehicle 100. When it is determined that there is a sufficient empty space in front or on the right side of the vehicle 100, the processor 350 may generate and provide a right steering control signal and an acceleration control signal to the vehicle to control the trailer 900 to travel toward the right. The processor 350 may generate and provide a vehicle control signal to control the vehicle 100 to travel in a right forward direction so that the trailer 900 becomes away a preset distance from the object.

If the trailer 900 approaches an object 1510 located on the right side of the trailer 900, the processor 350 may determine, based on information received from the sensing unit 125, whether there is a sufficient empty space in front or on the left side of the vehicle 100. The processor 350 may generate and provide a left steering control signal and an acceleration control signal to the vehicle 100 to control the trailer 900 to travel toward the left. The processor 350 may generate and provide a vehicle control signal to control the vehicle 100 to travel in a left forward direction so that the trailer 900 becomes away a preset distance from the object 1510.

Figure 16A:
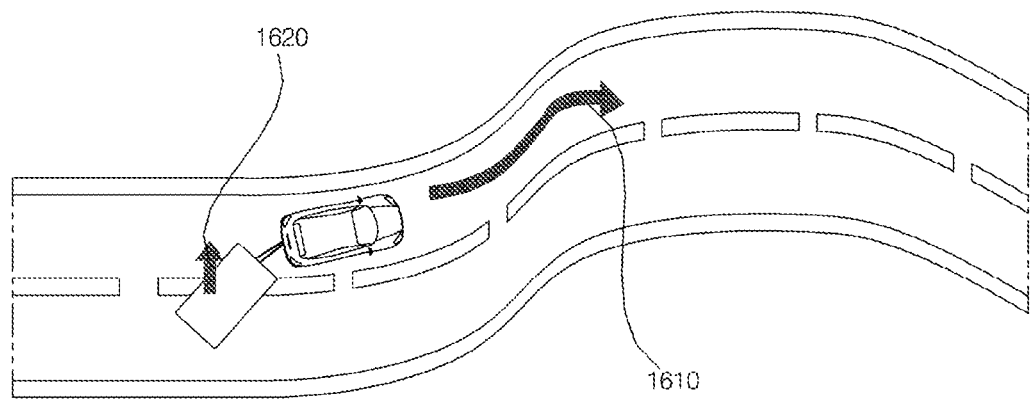
FIGS. 16A and 16B are diagrams illustrating an example vehicle and an example trailer where an example apparatus controls the vehicle to maintain a traveling lane of the trailer.
Figure 16B:
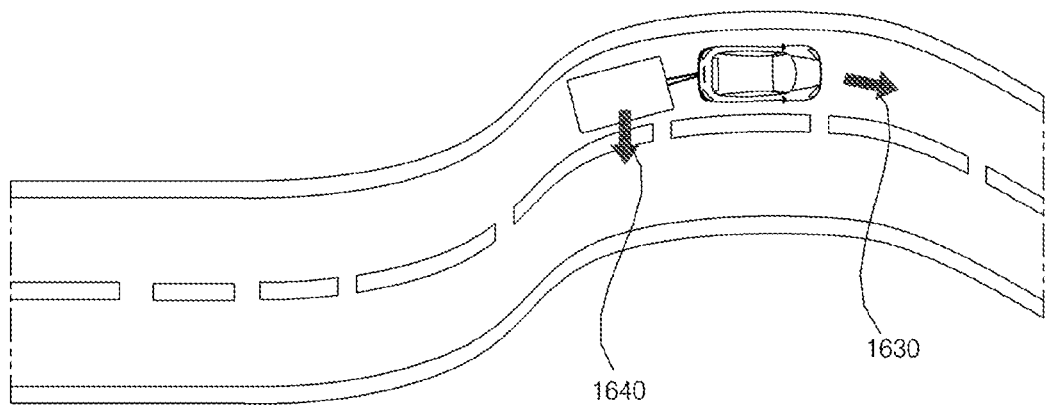

FIGS. 16A and 16B illustrate an example vehicle and an example trailer where an example apparatus controls the vehicle to maintain a traveling lane of the trailer.

Referring to FIGS. 16A and 16B, the processor 350 may detect the current lane of travel of the vehicle 100 from an image of the surroundings of the vehicle 100 received from the camera unit 310. The processor 350 may detect the current lane of travel of the trailer 900 from an image of the surroundings of the vehicle 100 received from the camera unit. In addition, the processor 350 may detect the current lane of travel of the trailer 900 from images received from a plurality of cameras 910 of the trailer 900 via the interface 330.

The processor 350 may determine an attitude of the trailer 900 based on the image of the surroundings of the vehicle 100 received from the camera unit 310. Based on the attitude of the trailer 900, the processor 350 may determine whether the trailer 900 is out of the lane of travel.

FIG. 16A shows a case where the trailer 900 is out of its lane of travel.

The processor 350 may detect a lane of travel of the trailer 900 based on an attitude of the trailer 900 in an image of the surroundings of the vehicle 100 received from the camera unit 310.

The processor 350 may determine whether the detected lane of travel of the trailer 900 is the same as a lane of travel of the vehicle 100.

If the detected lane of travel of the trailer 900 is different from the lane of travel of the vehicle 100, the processor 350 may determine that the trailer 900 is out of the lane of travel of the vehicle.

The processor 350 may generate and provide a brake control signal and a steering control signal to the trailer 900.

By controlling acceleration and steering based on a lane of travel, the vehicle 100 may alter a travel path 1620 of the trailer 900 and control the trailer 900 to return to the lane of travel of the vehicle 100.

For example, when the trailer 900 is out of the left line of the lane of travel of the vehicle 100, the processor 350 may generate and provide a right steering control signal and an acceleration signal to the vehicle 100 so that the trailer 900 travels toward the right.

The processor 350 may generate and provide a control signal to control the vehicle 100 to travel in a right forward direction until the trailer 900 enters the lane of travel of the vehicle 100.

If the overall length direction of the trailer 900 comes in parallel with the lane of travel of the vehicle 100 when the vehicle 100 is travelling in a right forward direction, the processor 350 may generate and provide an acceleration control signal to control the vehicle 100 to travel straight so that the trailer 900 returns back to the lane of travel of the vehicle 100.

For example, if the trailer 900 is out of the right line of the lane of travel of the vehicle 100, the processor 350 may generate and provide a left steering control signal and an acceleration signal to the vehicle 100 to control the trailer 900 to travel toward the left.

The processor 350 may generate and provide a control signal to control the vehicle 100 to travel in a left forward direction until the trailer 900 enters the lane of travel of the vehicle 100.

If the overall-length direction of the trailer 900 comes in parallel with the lane of travel of the vehicle 100 when the vehicle 100 is travelling in the left forward direction, the processor 350 provides an acceleration control signal to control the vehicle 100 to travel straight so that the trailer 900 returns back to the lane of travel of the vehicle 100.

FIG. 16B shows a case where a trailer is about to move out of its lane of travel.

The processor 350 may detect a lane of travel of the trailer 900 based on an attitude of the trailer 900 in an image of the surroundings of the vehicle 100 received from the camera unit 310.

The processor 350 may generate a travel path 1640 of trailer 900 based on the attitude of the trailer 900.

The processor 350 may determine whether the generated travel path 1640 of the trailer 900 moves out of the lane of travel of the trailer 900.

The processor 350 may generate and provide the acceleration control signal and the steering control signal to the vehicle drive unit 150 so that the travel path 1640 of the trailer 900 is maintained in a lane of travel 1630.

In accordance with the acceleration control signal and the steering control signal, the vehicle 100 may alter the travel path 1640 of the trailer 900 and control the trailer 900 to maintain the lane of travel 1630.

For example, when the trailer 900 is about to move out of the left line of a lane of travel of the vehicle 100, the processor 350 may generate and provide a right steering control signal and an acceleration control signal so as to alter a travel path of the trailer 900 to the right.

The processor 350 may control the vehicle 100 to travel in a right forward direction until the travel path of the trailer 900 enters the lane of travel of the vehicle 100.

For example, when the trailer 900 is about to move out of the right line of a lane of travel of the vehicle 100, the processor 350 may generate and provide a left steering control signal and an acceleration control signal to the vehicle 100 so as to alter the travel path of the trailer 900 to the left.

The processor 350 may control the vehicle 100 to travel in a left forward direction until the travel path of the trailer 900 enters the lane of travel of the vehicle 100.

Figure 17A:
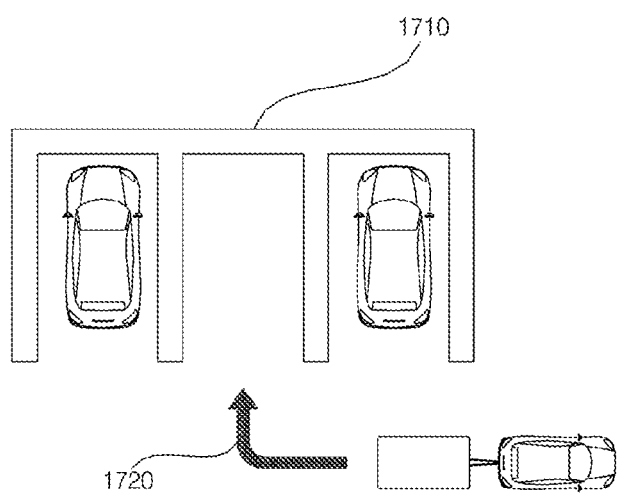
FIGS. 17A and 17B are diagrams illustrating an example vehicle and an example trailer where an example apparatus controls parking of the vehicle and the trailer.
Figure 17B:
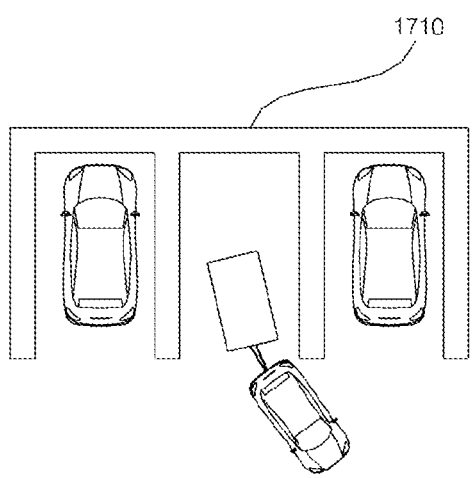

FIGS. 17A and 17B illustrates an example vehicle and an example trailer where an example apparatus controls parking of the vehicle and the trailer.

FIG. 17A shows the case of generating a parking space and a parking path based on an attitude of a trailer.

The processor 350 may be provided from the camera unit 310 with images of the surroundings which include the vehicle 100 and the trailer. The processor 350 may determine an attitude of the trailer based on the image provided from the camera unit 310. The processor 350 may determine a parking space 1710 based on an attitude of the trailer.

The processor 350 may detect an object located around the vehicle 100 and the trailer 100 by using the object detection unit 160. The processor 350 may determine the parking space 1710 based on the object detected via the object detection unit 160.

The processor 350 may generate a parking path 1720 of the vehicle 100 connected with the trailer based on the parking space 1710.

The processor 350 may determine forward movement, backward movement, and a steering angle of the trailer, which are required for the trailer to be parked in the parking space 1710. The processor 350 may generate and provide an acceleration control signal, a brake control signal, and a steering control signal to the vehicle 100 in order to control the forward movement, the backward movement, and the steering angle required for parking the trailer.

FIG. 17B shows a case of parking a trailer backwards along a parking path.

By controlling an acceleration control signal, a brake control signal, and a steering control signal based on the parking path 1720, the vehicle 100 may move the trailer 900 so that the trailer is parked in the parking space 1710.

The processor 350 may generate and provide an acceleration control signal, a brake control signal, and a steering control signal to the vehicle drive unit 150 so as to change the attitude of the trailer when the trailer is travelling backwards in the parking space 1710.

If it is determined that the trailer is able to enter the parking space 1710 when the attitude thereof is being changed, the processor 350 may generate and provide a brake control signal to the vehicle drive unit 150 so that the trailer 900 stops.

When the trailer 900 travels backwards to the rear right corner along the parking path 1720, the processor 350 may generate and provide a left steering angle control signal and an acceleration control signal to the vehicle drive unit 150 to control the vehicle 100 to travel backwards to the left so that the trailer travels backwards to the right.

To control the trailer to travel backwards to the rear left corner along the parking path 1720, the processor 350 may generate and provide a right steering angle control signal and an acceleration control signal to the vehicle drive unit 150 to control the vehicle 100 to travel backwards to the right so that the trailer travels backwards to the left.

If information detected by the object detection unit 160 shows that a distance between an object detected and the trailer 900 is equal to or smaller than a preset value when the trailer is travelling backwards, the processor 350 may generate and provide a brake control signal to the vehicle drive unit 150 so that the trailer stops.

If it is determined that the overall length direction of the trailer is aligned with the parking space 1710, the processor 350 may generate and provide an acceleration control signal so that the trailer travels backwards in the overall-length direction.

Figure 18A:
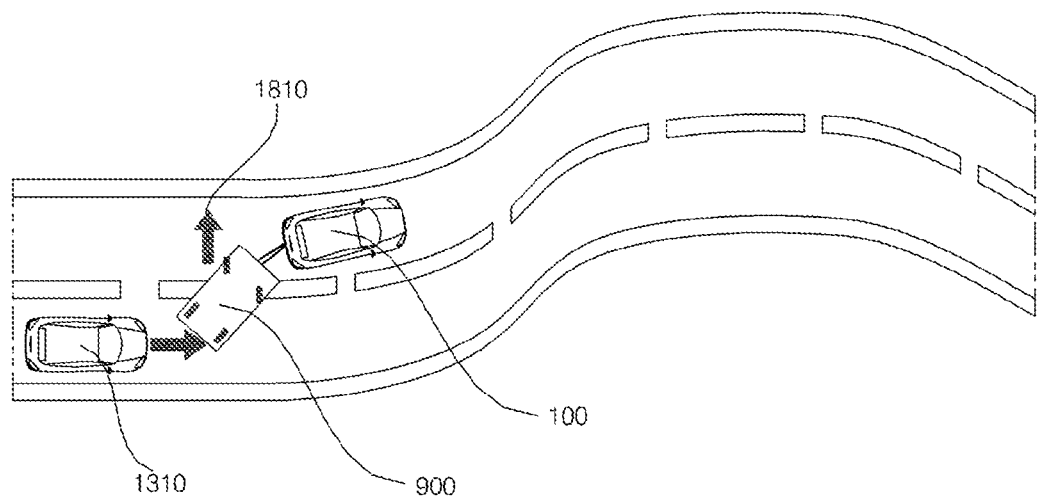
FIGS. 18A and 18B are diagrams illustrating an example vehicle and an example trailer where an example apparatus controls the trailer to avoid a collision between the trailer and an external object.
Figure 18B:
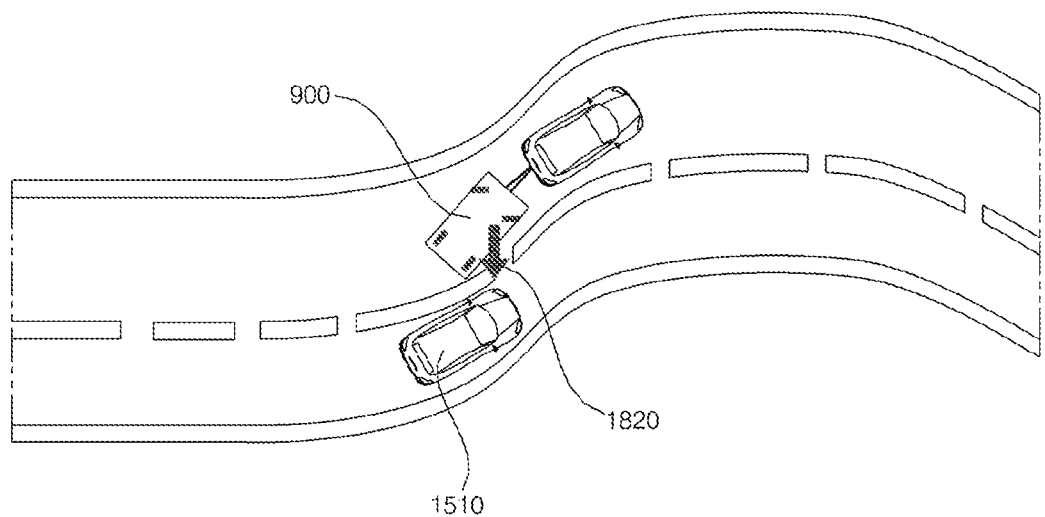

FIGS. 18A and 18B illustrate an example vehicle and an example trailer where an example apparatus controls the trailer to avoid a collision between the trailer and an external object.

The processor 350 may receive object detection information from the object detection unit 160. Based on the object detection information, the processor 350 may determine a location of a detected object 1510, a speed thereof, and a distance thereof from the trailer 900. Based on the object detection information, the processor 350 may determine whether there is a risk of collision between the trailer 900 and the detected object 1510.

The processor 350 may determine a location at which the trailer 900 is able to avoid collision with the object 1510. The processor 350 may generate a travel path 1810 of the trailer 900 required for the trailer 900 to move to the location. The processor 350 may generate at least one control signal between a brake control signal and a steering control signal to control the trailer 900 to avoid an approaching object. The processor 350 may generate and provide the brake control signal and the steering control signal to the trailer 900 via the interface unit 330.

FIG. 18A shows a case where an object approaches a trailer 900 which is travelling.

In FIG. 18A, the processor 350 may receive information on an object 1310, approaching the trailer 900, from the object detection unit 160 based on an attitude of the trailer 900.

The processor 350 may determine whether there is a risk of collision between the trailer 900 and the object 1510, by determining a travel path of the object 1510 based on the attitude of the trailer 900.

If it is determined that there is a risk of collision between the trailer 900 and the object 1510, the processor 360 may generate and provide a signal for controlling wheels of the trailer 900 to avoid the object.

If the object 1510 approaches the trailer 900 from the right side, the processor 350 may determine, based on information received from the sensing unit 125, whether there is a sufficient empty space on the left side of the trailer 900. If there is a sufficient empty space on the left side of the trailer 900, the processor 350 may generate and provide a left steering angle control signal to the trailer 900 to control the trailer 900 to travel toward the left.

The processor 350 may generate and provide a signal for controlling the wheels of the trailer 900 to the trailer 900 via the interface 330 so that that the trailer 900 travels in a left forward direction and therefore moves a preset distance away from the object 1510.

If an object approaches the trailer 900 from the left, the processor 350 may determine, based on information received from the sensor 125, whether there is a sufficient empty space on the right side of the trailer 900. If there is a sufficient empty space on the right side of the trailer 900, the processor 350 may generate and provide a right steering control signal and an acceleration control signal to the trailer 900 to control the trailer 900 to travel toward the right. The processor 350 may generate and provide a signal for controlling the wheels of the trailers 900 to the trailer 900 via the interface 330 so that the trailer 900 travels in a right forward direction and therefore moves a preset distance away from the object.

In accordance with the signal for controlling the wheels of the trailer 900, the trailer 900 may move 1810 a preset distance from the object, thereby enabled to avoid a collision.

FIG. 18B shows a case where the trailer 900 which is travelling approaches an object.

In FIG. 18B, the processor 350 may receive, from the object detection unit 160, information on an object 1510 which the trailer 900 approaches. The processor 350 may determine an attitude of the trailer 900. The processor 350 may determine whether there is a risk of collision between the trailer 900 and the object 1510, by determining a travel path 1820 of the trailer 900 which corresponds to the attitude of the trailer 900.

If it is determined that there is a risk of collision between the trailer 900 and the object 1510, the processor 350 may generate and provide a signal for controlling the wheels of the trailer 900 to avoid the collision.

If the trailer 900 approaches an object behind, the trailer 900 provide a brake control signal to the wheels of the trailer 900 so that the trailer 900 stops. The processor 350 may generate and provide a braking control signal so that the trailer 900 moves a preset distance away from the object.

If the trailer 900 approaches an object located on the left side thereof, the processor 350 may determine based on information received from the sensing unit 125, whether there is a sufficient empty space on the right side of the trailer 900. If there is a sufficient empty space on the right side of the trailer 900, the processor 350 may generate and provide a right steering control signal and an acceleration control signal to the wheels of the trailer 900 so that the trailer 900 travels toward the right. The processor 350 may generate and provide a signal for turning the wheels of the trailer 900 to the right so that the trailer 900 moves a preset distance away from the object.

If the trailer 900 approaches an object located on the right side thereof, the processor 350 may determine, based on information received from the sensing unit 125, whether there is a sufficient empty space on the left side of the trailer 900. If there is a sufficient empty space on the left side of the trailer 900, the processor 350 may generate and provide a left steering control signal and an acceleration control signal to the trailer 900 so that the trailer 900 travels toward the left. The processor 350 may generate and provide a signal for turning the wheels of the trailer 900 to the right so that the trailer 900 moves a preset distance away from the object.

Figure 19A:
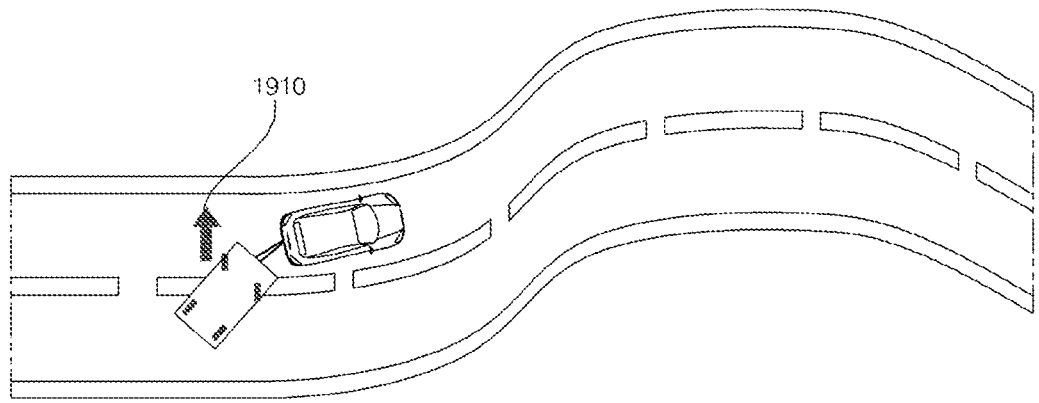
FIGS. 19A and 19B are diagrams illustrating an example vehicle and an example trailer where an example apparatus controls the trailer to maintain a traveling lane of the trailer.
Figure 19B:
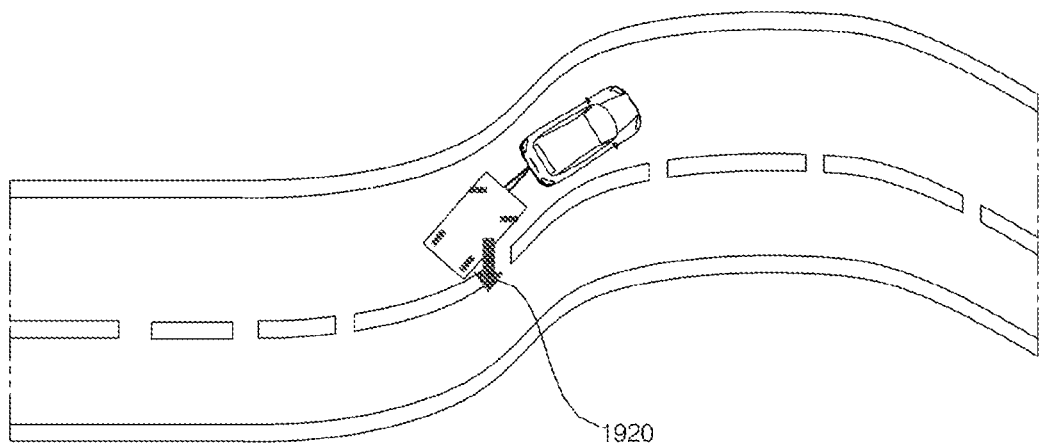

FIGS. 19A and 19B illustrate an example vehicle and an example trailer where an example apparatus controls the trailer to maintain a traveling lane of the trailer.

Referring to FIGS. 19A and 19B, the processor 350 may detect a lane of travel of the vehicle 100 based on an image of the surroundings of the vehicle 100 received from the camera unit 310. The processor 350 may detect a lane of travel of the trailer 900 from an image received from the camera unit 310. The processor 350 may detect a lane of travel of the trailer 900 from images received from a plurality of cameras 910 via the interface 330.

The processor 350 may determine, based on an attitude of the trailer 900, whether the trailer 900 is out of the lane of travel of the vehicle 100.

FIG. 19A shows a case where a trailer is out of its lane of travel.

The processor 350 may detect a lane of travel of the trailer 900 based on an attitude of the trailer 900 in an image of the surroundings of the vehicle 100 received from the camera 310.

The processor 350 may determine whether the detected lane of travel of the trailer 900 is the same as a lane of travel of the vehicle 100.

If the detected lane of travel of the trailer 900 is different from the lane of travel of the vehicle 100, the processor 350 may determine that the trailer 900 is out of the lane of travel of the vehicle 100.

The processor 350 may generate and provide a brake control signal and a steering control signal to the trailer 900.

For example, if the trailer 900 is out of the right line of the lane of travel of the vehicle 100, the processor 350 may generate and provide a right steering control signal to the trailer 900 so that the trailer 900 travels toward the left.

The trailer 900 may keep travelling with the wheels thereof being turned to the right until the trailer 900 enters the lane of travel of the vehicle 100.

For example, if the trailer 900 is out of the right line of the lane of travel of the vehicle 100, the processor 350 may generate and provide a left steering control signal and an acceleration control signal so that the trailer 900 travels toward the left.

The trailer 900 may keep travelling with the wheels thereof being turned to the left until the trailer 900 enters the lane of travel of the vehicle 100.

FIG. 19B shows a case where a trailer is about to move out of its lane of travel.

The processor 350 may detect a lane of travel of the trailer 900 based on an attitude of the trailer 900 in an image of the surroundings of the vehicle 100 received from the camera unit 310.

The processor 350 may generate a travel path 1920 of the trailer 900 based on the attitude of the trailer 900.

The processor 350 may determine whether the travel path 1920 of the trailer 900 moves out of the lane of travel the trailer 900.

The processor 350 may generate and provide a steering control signal to the trailer 900 via the interface 330 so that the travel path 1920 of the trailer 900 is maintained in the lane of travel of the trailer 900.

The trailer 900 may control the wheels thereof in accordance with the steering control signal.

The processor 350 may alter the travel path 1920 of the trailer 900 by controlling the wheels of the trailer 900, and may provide a control signal so that the trailer 900 maintains the lane of travel.

For example, if the trailer 900 is about to move out of the left line of a lane of travel of the vehicle 100, the processor 350 may generate and provide a right steering control signal to the trailer 900 via the interface 330 so as to alter a travel path of the trailer 900 to the right.

The trailer 900 may keep travelling with the wheels thereof being turned to the right until the travel path of the trailer 900 enters the lane of travel of the vehicle 100.

For example, if the trailer 900 is about to move out of the right line of a lane of travel of the vehicle 100, the processor 350 may generate and provide a left steering control signal to the vehicle 100 via the interface 330 so as to alter a travel path of the trailer 900 to the left.

The trailer 900 may keep traveling with the wheels thereof being turned to the left until the travel path of the trailer 900 enters the lane of travel of the vehicle 100.

Figure 20:
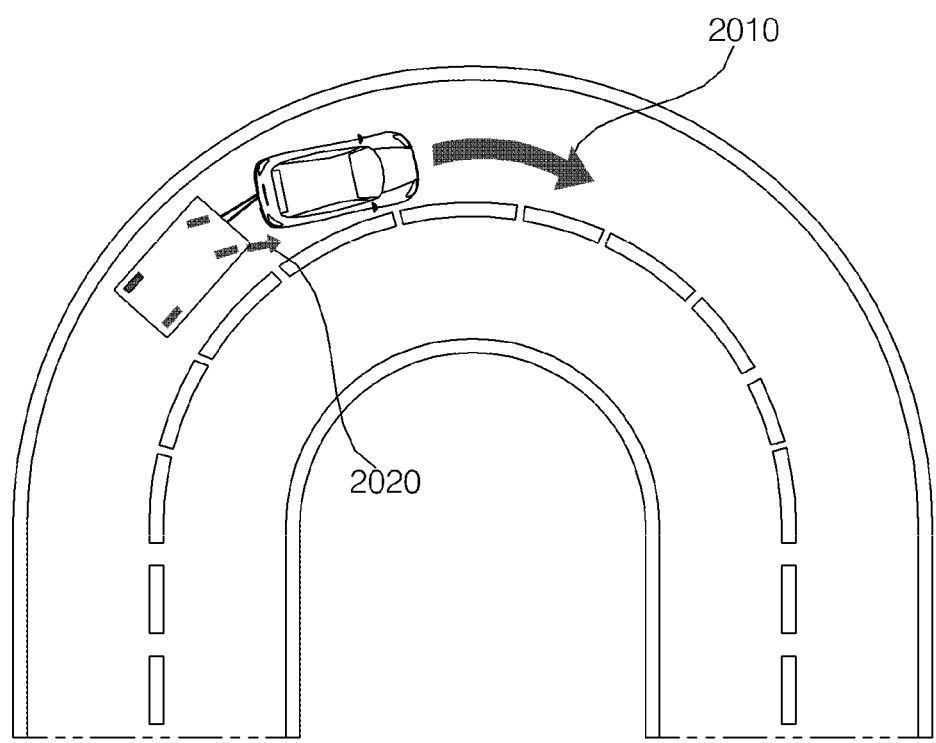
FIG. 20 is a diagram illustrating an example vehicle and an example trailer where an example apparatus controls the trailer to travel on the same lane with the vehicle.

FIG. 20 illustrates an example vehicle and an example trailer where an example apparatus controls the trailer to travel on the same lane with the vehicle.

FIG. 20 shows a case where the trailer is cornering while maintaining the same travel path of the vehicle.

The processor 350 may receive an around view image including the vehicle 100 and the trailer 900 from the camera unit 310. The processor 350 may determine an attitude of the trailer 900 based on an image received from the camera unit 310. The processor 350 may generate a travel path 2020 of the trailer 900 based on the determined attitude of the trailer 900.

The processor 350 may generate and provide a steering control signal corresponding to a travel path 2010 of the vehicle 100 to the trailer 900 via the interface 330 so that the trailer 900 travels along a travel path which is the same as the travel path 2010 of the vehicle 100.

For example, when the travel path 2020 of the trailer 900 is inclined to the left compared to a travel path of the vehicle 100, the processor 350 may generate and provide a steering control signal to turn the wheels of the trailer 900 to the right. The processor 350 may generate and provide a right steering control signal until the travel path 2020 of the trailer 900 runs in the same direction as that of the travel path of the vehicle 100.

For example, when the travel path 2020 of the trailer 900 is inclined to the right compared to a travel path of the vehicle 100, the processor 350 may generate and provide a steering control signal to turn the wheels of the trailer 900 to the left. The processor 350 may generate and provide a right steering control signal until the travel path 2020 of the trailer 900 runs in the same direction as that of the travel path of the vehicle 100.

The implementations described above may be implemented as code that can be written on a computer-readable medium in which a program is recorded and thus read by a computer. The computer-readable medium includes all kinds of recording devices in which data is stored in a computer-readable manner. Examples of the computer-readable recording medium may include a hard disk drive (HDD), a solid state disk (SSD), a silicon disk drive (SDD), a read only memory (ROM), a random access memory (RAM), a compact disk read only memory (CD-ROM), a magnetic tape, a floppy disc, and an optical data storage device. In addition, the computer-readable medium may be implemented as a carrier wave (e.g., data transmission over the Internet). In addition, the computer may include the processor 350 or the controller 170. Thus, the above detailed description should not be construed as being limited to the implementations set forth herein in all terms, but should be considered by way of example.

The examples described above can be modified. In particular, various variations and modifications are possible in the component parts and/or arrangements of the subject combination arrangement within the scope of the disclosure, the drawings and the appended claims. In addition to variations and modifications in the component parts and/or arrangements, any suitable alternatives in the component parts and/or arrangements are possible.

What is claimed is:

1. An apparatus for providing an around view image for a vehicle, the apparatus comprising:
   a camera unit that is configured to obtain an outside image of the vehicle; and
   a processor that is configured to:
      determine a connection state between a trailer and the vehicle,
      receive the outside image of the vehicle from the camera unit,
      based on the outside image of the vehicle, determine an attitude of the trailer, and
      based on the attitude of the trailer, generate a control signal to control travel of the vehicle,
   wherein the processor is further configured to:
      based on an attitude of the trailer, generate a control signal to control wheels of the trailer, the control signal being configured to control at least one of braking or steering of the trailer,
      obtain object detection information about an object located outside the vehicle,
      based on the object detection information, detect a third distance between the trailer and the object,
      determine whether the third distance satisfies a second reference distance,
      based on a determination that the third distance satisfies the second reference distance, determine whether there is a risk of collision between the trailer and the object, and
      based on a determination that there is a risk of collision between the trailer and the object, generate a control signal to control the trailer to keep a fourth distance between the trailer and the object.

2. The apparatus of claim 1, further comprising:
   an interface that is configured to receive data from the trailer,
   wherein the processor is configured to:
      based on the data, determine the connection state between the trailer and the vehicle.

3. The apparatus of claim 1, further comprising:
   a memory that is configured to store markers representing a preset attitude of the trailer,
   wherein the processor is configured to:
      obtain a rear view image of the vehicle from the camera unit,
      detect the trailer from the rear view image,
      receive the markers from the memory,
      match each of the markers with at least one portion of the trailer in the rear view image,
      determine an angle between the at least one portion of the trailer and each of the markers, and
      based on the angle, determine the attitude of the trailer.

4. The apparatus of claim 1, further comprising:
   an interface that is configured to receive gyro sensing information from a gyro sensor that is mounted on the trailer,
   wherein the processor is configured to:
      based on the gyro sensing information, determine the attitude of the trailer.

5. The apparatus of claim 1, wherein the processor is configured to:
   obtain a plurality of images from the camera unit,
   based on (i) a vehicle image of the vehicle and (ii) the plurality of images, generate a first around view image, and
   provide the first around view image to a display.

6. The apparatus of claim 5, further comprising:
   an interface that is configured to receive an outside image of the trailer from a camera unit of the trailer,
   wherein the processor is configured to:
      based on (i) the first around view image and (ii) the outside image of the trailer, generate a second around view image, and
      provide the second around view image to the display.

7. The apparatus of claim 6, wherein the interface is configured to:

receive sensing information from one or more sensors of the trailer, the one or more sensors including at least one of a radar, a lidar, an ultrasonic sensor, or an infrared sensor, and wherein the processor is configured to:
based on the sensing information, generate a third around view image, and
provide the third around view image to the display.

8. The apparatus of claim 5, further comprising:
a memory that is configured to store a plurality of Look Up Tables (LUTs), each LUT of the plurality of LUTs corresponding to a respective attitude of the trailer,
wherein, based on a current attitude of the trailer, the processor is configured to:
receive a first LUT from the plurality of LUTs, the first LUT corresponding to the current attitude of the trailer,
determine a fourth around view image that corresponds to the first LUT, and
provide the fourth around view image to the display.

9. The apparatus of claim 1, wherein the processor is configured to:
based on a driving condition of the trailer, generate a control signal to operate a hitch at (i) a fixed state in which the hitch is fixed or (ii) an adjustable state in which the hitch is adjustable.

10. The apparatus of claim 9, wherein the processor is configured to:
in a state in which the vehicle travels straight, generate a control signal to operate the hitch at the fixed state.

11. The apparatus of claim 9, wherein the processor is configured to:
determine whether a turning angle of the vehicle satisfies a first angle, and
based on a determination that the turning angle of the vehicle satisfies the first angle, generate a control signal to operate the hitch at the adjustable state.

12. The apparatus of claim 1, wherein the processor is configured to:
based on an attitude of the trailer, generate a control signal to control at least one of acceleration, braking, or steering of the vehicle.

13. The apparatus of claim 12, wherein the processor is configured to:
obtain object detection information about an object located outside the vehicle, and
based on an attitude of the trailer, adjust the object detection information.

14. The apparatus of claim 13, wherein the processor is configured to:
based on the object detection information, detect a first distance between the trailer and the object,
determine whether the first distance satisfies a first reference distance,
based on a determination that the first distance satisfies the first reference distance, determine whether there is a risk of collision between the trailer and the object, and
based on a determination that there is a risk of collision between the trailer and the object, generate a control signal to control the vehicle to keep a second distance between the trailer and the object.

15. The apparatus of claim 12, wherein the processor is configured to:
obtain one or more images from the vehicle and the trailer,
based on the one or more images, determine a travel lane of the trailer, and
generate a control signal to control the vehicle such that the trailer maintains the travel lane.

16. The apparatus of claim 12, wherein the processor is configured to:
based on an attitude of the trailer, generate a parking path for parking the trailer, and
generate a control signal to control the vehicle such that the trailer moves along the parking path.

17. The apparatus of claim 1, wherein the processor is configured to:
obtain one or more images from the vehicle and the trailer,
based on the one or more images, determine a travel lane of the trailer, and
generate a control signal to control the trailer to maintain the travel lane.

18. The apparatus of claim 1, wherein the processor is configured to:
obtain information about a travel path of the vehicle, and
based on the information about the travel path of the vehicle, generate the control signal to control the trailer to move along the travel path of the vehicle.

* * * * *